US009122338B2

(12) United States Patent  (10) Patent No.: US 9,122,338 B2
Chien  (45) Date of Patent: Sep. 1, 2015

(54) OPTICAL SWITCHING DEVICE AND STEREOSCOPIC DISPLAY DEVICE INTEGRATED WITH TOUCH STRUCTURE

(71) Applicant: Au Optronics Corporation, Hsinchu (TW)

(72) Inventor: Yu-Feng Chien, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 80 days.

(21) Appl. No.: 14/047,030

(22) Filed: Oct. 7, 2013

(65) Prior Publication Data

US 2015/0036062 A1   Feb. 5, 2015

(30) Foreign Application Priority Data

Aug. 1, 2013   (TW) .............................. 102127645 A

(51) Int. Cl.
  *G02F 1/1335*   (2006.01)
  *G06F 3/041*   (2006.01)
(52) U.S. Cl.
  CPC ................................... *G06F 3/0412* (2013.01)
(58) Field of Classification Search
  CPC . G02F 1/13338; G02F 1/1335; G02F 1/1343; G02F 2201/44; G02B 27/22; G02B 27/225; H04N 13/00; H04N 13/0018; H04N 13/0411; H01L 27/3244
  USPC .............. 345/173, 207; 349/12, 15, 139, 193; 348/51; 359/462
  See application file for complete search history.

(56) References Cited

U.S. PATENT DOCUMENTS

| 7,924,350 | B2 | 4/2011 | Ma et al. | |
| 8,052,498 | B2 | 11/2011 | Chien et al. | |
| 2009/0085885 | A1 | 4/2009 | Wu et al. | |
| 2009/0315859 | A1 | 12/2009 | Chien et al. | |
| 2010/0149116 | A1 | 6/2010 | Yang et al. | |
| 2012/0327005 | A1 | 12/2012 | Hamada et al. | |
| 2012/0327349 | A1* | 12/2012 | Wang et al. | ................... 349/139 |
| 2013/0271675 | A1* | 10/2013 | Misaki | ............................ 349/12 |
| 2014/0009819 | A1* | 1/2014 | Wu et al. | ........................ 359/315 |

FOREIGN PATENT DOCUMENTS

| EP | 2533136 | 12/2012 |
| TW | 201234247 | 8/2012 |
| TW | 201301220 | 1/2013 |

* cited by examiner

*Primary Examiner* — Thoi Duong
(74) *Attorney, Agent, or Firm* — Jianq Chyun IP Office

(57) ABSTRACT

An optical switching device integrated with a touch structure includes a first substrate, a second substrate, a switchable optical medium, a first driving layer, a touch-sensing layer, and a first insulation layer. The second substrate is opposite to the first substrate. The switchable optical medium is located between the first substrate and the second substrate. The first driving layer is located between the first substrate and the switchable optical medium for driving the switchable optical medium. The first driving layer includes a plurality of first driving electrodes, and first gaps exist between the first driving electrodes. Each of the first gaps extends along a first direction. The touch-sensing layer is located between the first substrate and the first driving layer. The first insulation layer is located between the first driving layer and the touch-sensing layer. A stereoscopic display device integrated with a touch structure is also provided.

53 Claims, 13 Drawing Sheets

OPTICAL SWITCHING DEVICE AND STEREOSCOPIC DISPLAY DEVICE INTEGRATED WITH TOUCH STRUCTURE

CROSS-REFERENCE TO RELATED APPLICATION

This application claims the priority benefit of Taiwan application serial no. 102127645, filed on Aug. 1, 2013. The entirety of the above-mentioned patent application is hereby incorporated by reference herein and made a part of this specification.

BACKGROUND OF THE INVENTION

1. Field of the Invention

The invention relates to an optical switching device and a stereoscopic display device. More particularly, the invention relates to an optical switching device integrated with a touch structure and a stereoscopic display device employing the optical switching device integrated with the touch structure.

2. Description of Related Art

Recently, with the progress of science and technology and the development of semiconductor industry, electronic products including personal digital assistants (PDAs), mobile phones, smart phones, and notebooks (NBs) have been extensively applied and have become more convenient, multi-functional, and stylish, thus providing consumers with more options. Owing to the increasing requirements for electronic products, display screens which play a crucial role in the electronic products have drawn attention from designers.

The electronic products are able to display images through the display screens; hence, data in the electronic products may be output in form of images. Stereoscopic display switching devices or touch input devices may be fixed or assembled to the housings/casings/shells of various display screens by means of mechanical devices, e.g., screws or locking members, so as to allow users to receive stereoscopic images or input messages through the display screens. Under said circumstances, however, additional manufacturing steps and components are required, and thus manufacturing costs and assembly time of the display screens (devices) may be increased.

SUMMARY OF THE INVENTION

The invention is directed to an optical switching device that is integrated with a touch structure. The optical switching device has built-in structures/devices that are capable of performing touch-sensing functions, and the resultant manufacturing costs and time may be reduced.

The invention is also directed to a stereoscopic display device that is integrated with a touch structure. The stereoscopic display device has built-in structures/devices that are capable of performing touch-sensing functions, and the resultant manufacturing costs and time may be reduced.

In an embodiment of the invention, an optical switching device integrated with a touch structure (device) includes a first substrate, a second substrate, a switchable optical medium, a first driving layer, a touch-sensing layer, and a first insulation layer. The second substrate is opposite to the first substrate. The switchable optical medium is located between the first substrate and the second substrate. The first driving layer is located between the first substrate and the switchable optical medium for driving the switchable optical medium. Besides, the first driving layer includes a plurality of first driving electrodes, and first gaps exist between the first driving electrodes. Each of the first gaps extends along a first direction. The touch-sensing layer is located between the first substrate and the first driving layer. The first insulation layer is located between the first driving layer and the touch-sensing layer.

In an embodiment of the invention, a stereoscopic display device integrated with a touch structure (device) is provided, and the stereoscopic display device includes the optical switching device integrated with the touch structure (device). The display panel is located on one side of the optical switching device integrated with the touch structure (device). Besides, the display panel includes a third substrate, a fourth substrate, and a display medium layer sandwiched by the third substrate and the fourth substrate. The display panel also has a plurality of sub-pixels. Each of the sub-pixels has an active device connected to a signal line and a pixel electrode, and the pixel electrode is configured to drive the display medium layer.

According to an embodiment of the invention, the first substrate has a long side, and an included angle between the first direction and the long side of the first substrate ranges from 1° to 179°.

According to an embodiment of the invention, the touch-sensing layer has a plurality of sensing electrodes. Each of the sensing electrodes has a plurality of second gaps, and each of the second gaps extends along the first direction.

According to an embodiment of the invention, a width of each of the first gaps is substantially equal to a width of each of the second gaps.

According to an embodiment of the invention, a width of each of the first gaps is greater than a width of each of the second gaps.

According to an embodiment of the invention, a width of each of the first gaps is smaller than a width of each of the second gaps.

According to an embodiment of the invention, an orthogonal projection of each of the first gaps on the first substrate overlaps an orthogonal projection of one of the second gaps on the first substrate.

According to an embodiment of the invention, an orthogonal projection of each of the first gaps on the first substrate is located between two orthogonal projections of two of the second gaps adjacent to each other on the first substrate.

According to an embodiment of the invention, an orthogonal projection of each of the first gaps on the first substrate is substantially identical to an orthogonal projection of one of the second gaps on the first substrate.

According to an embodiment of the invention, the sensing electrodes include a plurality of first sensing electrodes and a plurality of second sensing electrodes. Each of the first sensing electrodes includes a plurality of first electrode portions and a plurality of first bridge portions, and each of the first bridge portions is connected to two of the first electrode portions adjacent to each other. Each of the second sensing electrodes includes a plurality of second electrode portions and a plurality of second bridge portions, and each of the second bridge portions is connected to two of the second electrode portions adjacent to each other. The first electrode portions do not overlap the second electrode portions, and vice versa. The first bridge portions intersect the second bridge portions, and the second gaps are at least arranged in the first electrode portions and the second electrode portions.

According to an embodiment of the invention, the touch-sensing layer further includes a second insulation layer located between the first sensing electrodes and the second sensing electrodes.

According to an embodiment of the invention, the optical switching device integrated with the touch structure (device) further includes a second driving layer that is located between the switchable optical medium and the second substrate.

According to an embodiment of the invention, the second driving layer includes a plurality of second driving electrodes. Third gaps exist between the second driving electrodes, and each of the third gaps extends along a second direction.

According to an embodiment of the invention, the second direction is substantially parallel to the first direction.

According to an embodiment of the invention, the second direction intersects the first direction.

According to an embodiment of the invention, the second driving layer includes a planar electrode.

According to an embodiment of the invention, a signal of the first driving layer is independent from a signal of the touch-sensing layer.

In view of the above, the first driving layer in the optical switching device integrated with the touch structure (device) and in the stereoscopic display device drives the switchable optical medium, and the touch-sensing layer is located between the first substrate and the first driving layer, so as to perform the touch-sensing function. Here, the first gaps extending along the first direction exist between the first driving electrodes in the first driving layer. The touch-sensing layer may also have the second gaps. Since the first gaps and the second gaps are arranged in parallel, the optical switching device is able to achieve favorable visual effects, e.g., by reducing moire effect. Thereby, the display effects of the stereoscopic display device may be improved. As a result, both the optical switching device integrated with the touch structure (device) and the stereoscopic display device described herein have the built-in touch structure (device), so as to reduce the manufacturing costs/time and ensure satisfactory display quality.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
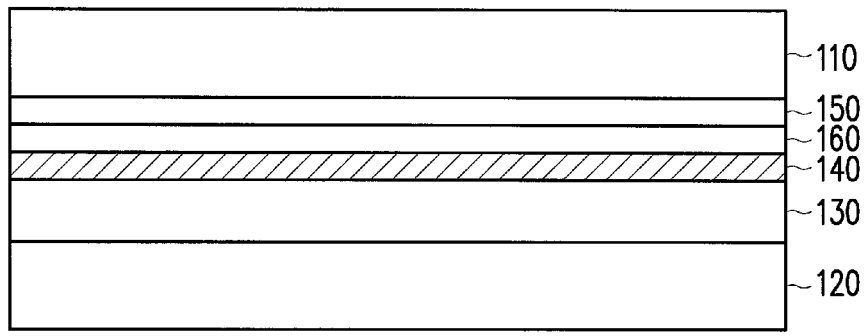
FIG. 1 is a schematic diagram illustrating an optical switching device integrated with a touch structure (device) according to an embodiment of the invention.

FIG. 1 is a schematic diagram illustrating an optical switching device integrated with a touch structure (device) according to an embodiment of the invention. With reference to FIG. 1, in the present embodiment of the invention, an optical switching device 100 that is integrated with a touch structure (device) or namely has a built-in touch structure (device) includes a first substrate 110, a second substrate 120, a switchable optical medium 130, a first driving layer 140, a touch-sensing layer 150, and a first insulation layer 160. The second substrate 120 is opposite to the first substrate 110, and the switchable optical medium 130 is located between the first substrate 110 and the second substrate 120. The first driving layer 140 is located between the first substrate 110 and the switchable optical medium 130 for driving the switchable optical medium 130. The touch-sensing layer 150 is located between the first substrate 110 and the first driving layer 140, and the first insulation layer 160 is located between the first driving layer 140 and the touch-sensing layer 150. In the present embodiment, the first substrate 110 and the second substrate 120 are transparent substrates and may be made of glass, plastic, or any other appropriate transparent material, for instance. A material of the switchable optical medium 130 includes a liquid crystal material, e.g., TN/STN/VA/IPS liquid crystal materials, a blue-phase liquid crystal material, or any other appropriate material. Besides, the switchable optical medium 130 may be driven by the first driving layer 140, such that the optical switching device 100 is capable of adjusting, changing, switching on, or switching off a path of light. Here, the first driving layer 140 and the touch-sensing layer 150 are preferably made of a transparent material or a semi-transparent material, e.g., indium tin oxide (ITO), aluminum zinc oxide (AZO), aluminum tin oxide, indium-gallium-zinc oxide (IGZO), zinc oxide, any other appropriate material, or a combination of the above. Besides, a material of the first insulation layer 160 includes an organic material (e.g., benzocyclobutene (BCB), polyimide (PI), polymethyl-methacrylate (PMMA), poly(4-vinylphenol) (PVP), polyvinyl alcohol (PVA), polytetrafluoroethene (PTFE), photoresist, any other appropriate organic material, or a combination thereof), an inorganic material (e.g., silicon oxide, silicon nitride, silicon oxynitride, aluminum oxide, any other appropriate inorganic material, or a combination thereof), any other appropriate material, or a combination thereof. In addition, the touch-sensing layer 150 located between the first substrate 110 and the first driving layer 140 allows the optical switching device 100 to be equipped with or to have the built-in (integrated) touch structure (device), and a user may operate the optical switching device 100 by touching an outer surface of the first substrate 110.

In addition, the first insulation layer 160 is located between the first driving layer 140 and the touch-sensing layer 150 according to the present embodiment, so as to separate the first driving layer 140 from the touch-sensing layer 150. Thereby, a signal of the first driving layer 140 is independent from a signal of the touch-sensing layer 150, i.e., the first driving layer 140 is electrically insulated from the touch-sensing layer 150. In the optical switching device 100, the touch-sensing layer 150 is built in between the first substrate 110 and the first driving layer 140, so as to omit several conventional manufacturing steps and reduce the manufacturing costs of the optical switching device 100.

Figure 2:
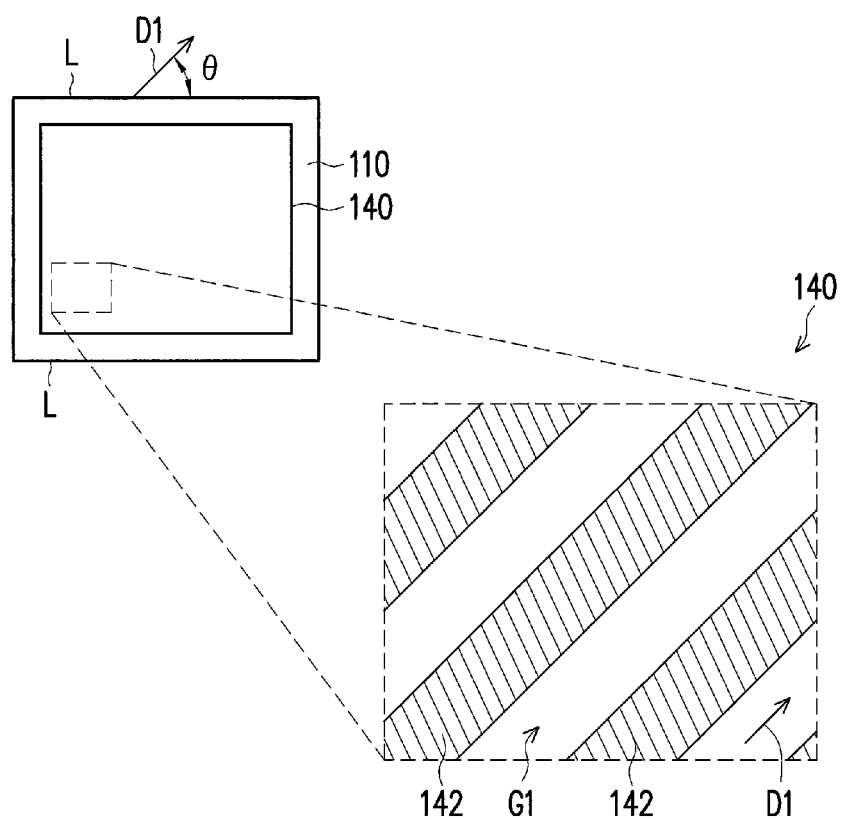
FIG. 2 is a schematic diagram illustrating the first driving layer depicted in FIG. 1.

FIG. 2 is a schematic diagram illustrating the first driving layer depicted in FIG. 1. With reference to FIG. 1 and FIG. 2, in the present embodiment, the first driving layer 140 includes a plurality of first driving electrodes 142. The first driving electrodes 142 are, for instance, bar-shaped electrodes or other polygonal electrodes, such as triangular electrodes, quadrilateral electrodes, rhombus-shaped electrodes, honeycomb-shaped electrodes, circular electrodes, branch-shaped electrodes, curved electrodes, or electrodes shaped in any other appropriate manner. The bar-shaped first driving electrodes 142 are sequentially arranged and located between the first substrate 110 and the switchable optical medium 130, and first gaps G1 exist between the first driving 142. Each of the first gaps G1 extends along a first direction D1. Besides, in the present embodiment, the first substrate 110 is a rectangular substrate, for instance. The first substrate 110 has long sides L, and an included angle θ between the first direction D1 and each long side L ranges from about 1° to about 179°. Preferably, the first gaps G1 in the present embodiment extend along the first direction D1 and are neither parallel nor perpendicular to the long sides L of the first substrate 110.

In the present embodiment, the optical switching device 100 integrated with the touch structure (device) is applicable to a stereoscopic display device, so as to adjust, control, switch on, or switch off a transmission path of a display beam of the stereoscopic display device and display planar (two-dimensional) or stereoscopic (three-dimensional) images. Hence, after the display beam passes the second substrate 120 and the switchable optical medium 130, the display beam 120 passes the first driving layer 140 and the touch-sensing layer 150 of the optical switching device 100 and is then emitted out of the first substrate 110 of the optical switching device 100 and can be seen by the user. Thereby, the electrode arrangement or the pattern design of the first driving layer 140 and the touch-sensing layer 150 poses an impact on the transmittance and the uniformity of the display beam, and the optical visual effects of the stereoscopic display device may then be affected. Four experimental examples are given below to explain different electrode arrangement or different pattern design of the first driving layer 140 and the touch-sensing layer 150.

Figure 3A:
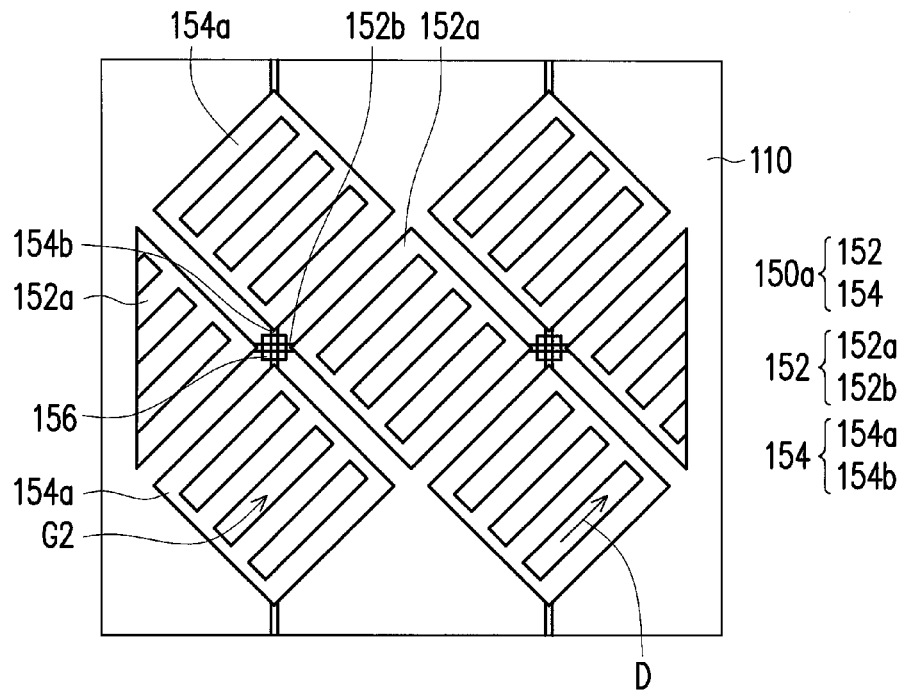
FIG. 3A is a schematic diagram illustrating a touch-sensing layer in an optical switching device according to a first experimental example of the invention.
Figure 3B:
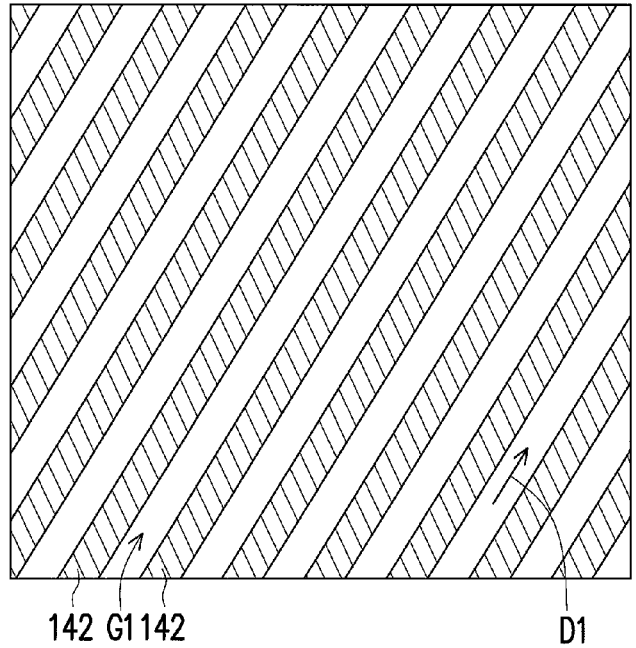
FIG. 3B is a schematic diagram illustrating the first driving layer in the optical switching device depicted in FIG. 3A.
Figure 3C:
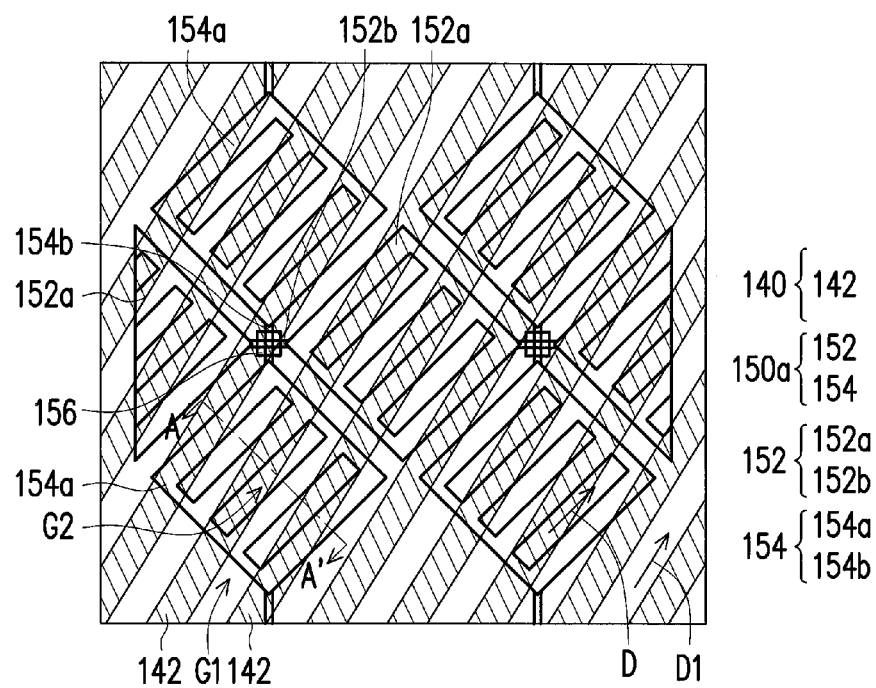
FIG. 3C is a schematic diagram illustrating the optical switching device depicted in FIG. 3A.
Figure 3D:
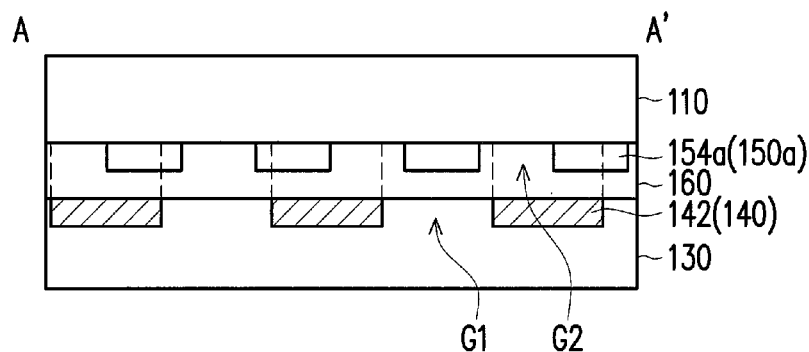
FIG. 3D is a cross-sectional diagram illustrating the optical switching device depicted in FIG. 3C along a sectional line A-A'.

FIG. 3A is a schematic diagram illustrating a touch-sensing layer in an optical switching device according to a first experimental example of the invention. FIG. 3B is a schematic diagram illustrating the first driving layer in the optical switching device depicted in FIG. 3A. FIG. 3C is a schematic diagram illustrating the optical switching device depicted in FIG. 3A. FIG. 3D is a cross-sectional diagram illustrating the optical switching device depicted in FIG. 3C along a sectional line A-A'. With reference to FIG. 3A to FIG. 3D, in the present experimental example, the touch-sensing layer 150a has a plurality of sensing electrodes, and the sensing electrodes exemplarily include a plurality of first sensing electrodes 152 and a plurality of second sensing electrodes 154. Each of the first sensing electrodes 152 includes a plurality of first electrode portions 152a and a plurality of first bridge portions 152b, and each of the first bridge portions 152b is connected to two of the first electrode portions 152a adjacent to each other. Each of the second sensing electrodes 154 includes a plurality of second electrode portions 154a and a plurality of second bridge portions 154b, and each of the second bridge portions 154b is connected to two of the second electrode portions 154a adjacent to each other. The first electrode portions 152a and the second electrode portions 154a are rhombus-shaped electrodes or other polygonal electrodes, such as bar-shaped electrodes, triangular electrodes, quadrilateral electrodes, honeycomb-shaped electrodes, circular electrodes, branch-shaped electrodes, curved electrodes, or electrodes shaped in any other appropriate manner. The first electrode portions 152a are serially connected by the first bridge portions 152b to form the first sensing electrodes 152, and the second electrode portions 154a are serially connected by the second bridge portions 154b to form the second sensing electrodes 154. Extension directions of the first sensing electrodes 152 intersect (e.g., are perpendicular to) extension direction of the second sensing electrodes; however, the first electrode portions 152a do not overlap the second electrode portions 154a, and vice versa. Particularly, the first electrode portions 152a are electrically insulated from and are not in contact with the second electrode portions 154a. Similarly, although the extension directions of the first sensing electrodes 152 intersect the extension direction of the second sensing electrodes 154 through the first bridge portions 152b and the second bridge portions 154b, the first bridge portions 152b are electrically insulated from and are not in contact with the second bridge portions 154b.

Additionally, in the present experimental example, the first electrode portions 152a, the first bridge portions 152b, and the second electrode portions 154a may be coplanar and formed by patterning a single-layered conductive layer, the first electrode portions 152a and the first bridge portions 152b are connected and are in contact with one portion of a surface of the first substrate 110, and the second electrode portions 154a are in contact with another portion of the surface of the first substrate 110. The first bridge portions 152b are located on one side (i.e., the first side) of a plurality of insulation patterns 156, and the second bridge portions 154b are constituted by another conductive layer and formed on the other side (i.e., the second side) of the insulation patterns 156, such that the insulation patterns 156 are located between the intersected first and second bridge portions 152b and 154b which are electrically insulated and are not in contact. Here, the other side (i.e., the second side) is the back side of the one side (i.e., the first side); that is, one of the two sides (i.e., the first side) of the insulation patterns 156 is close to an inner surface of the first substrate 110, and the other side (i.e., the second side) of the insulation patterns 156 is away from the inner surface of the first substrate 110. The order of forming the film layers in the first and second electrode portions 152a and 152b is not limited in the invention. In other experimental examples, the first and second electrode portions 152a and 152b may be respectively formed by different conductive layers, which will be explained below with reference to the drawings.

According to the present experimental example, each of the first and second sensing electrodes 152 and 154 has a plurality of second gaps G2. The second gaps G2 are at least arranged in the first electrode portions 152a and the second electrode portions 154a, and each of the second gaps G2 extends along a direction D, as shown in FIG. 3A. Besides, first gaps G1 exist between the first driving electrodes 142 in the first driving layer 140, and each of the first gaps G1 extends along the first direction D1, as shown in FIG. 3B. Therefore, when the touch-sensing layer 150a and the first driving layer 140 are sequentially arranged to form the optical switching device 100a described in the present experimental example, as shown in FIG. 3C and FIG. 3D, extension directions (i.e., the direction D) of the second gaps G2 of the first and second sensing electrodes 152 and 154 are different from extension directions (i.e., the first direction D1) of the first gaps G1 between the first driving electrodes 142. At this time, if the optical switching device 100a is applied to a stereoscopic display device, the optical visual effects of the stereoscopic display device may be worsened, e.g., the issue of moire effect may arise.

Figure 4A:
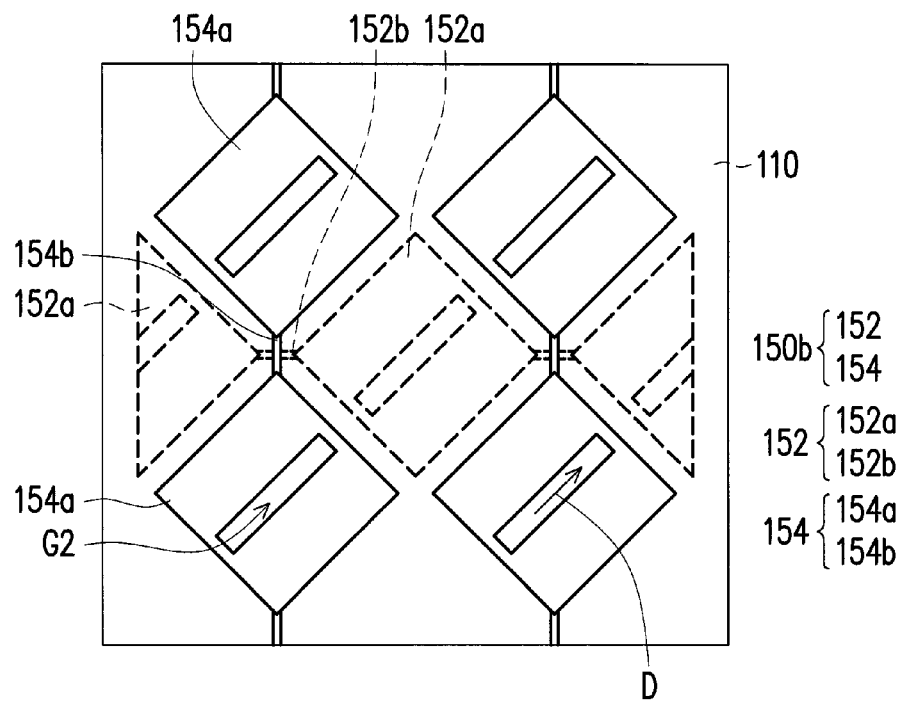
FIG. 4A is a schematic diagram illustrating a touch-sensing layer in an optical switching device according to a second experimental example of the invention.
Figure 4B:
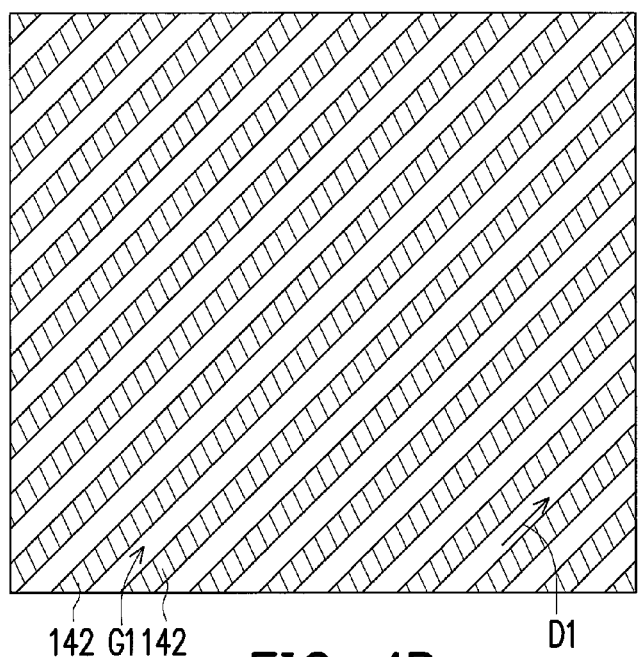
FIG. 4B is a schematic diagram illustrating the first driving layer in the optical switching device depicted in FIG. 4A.
Figure 4C:
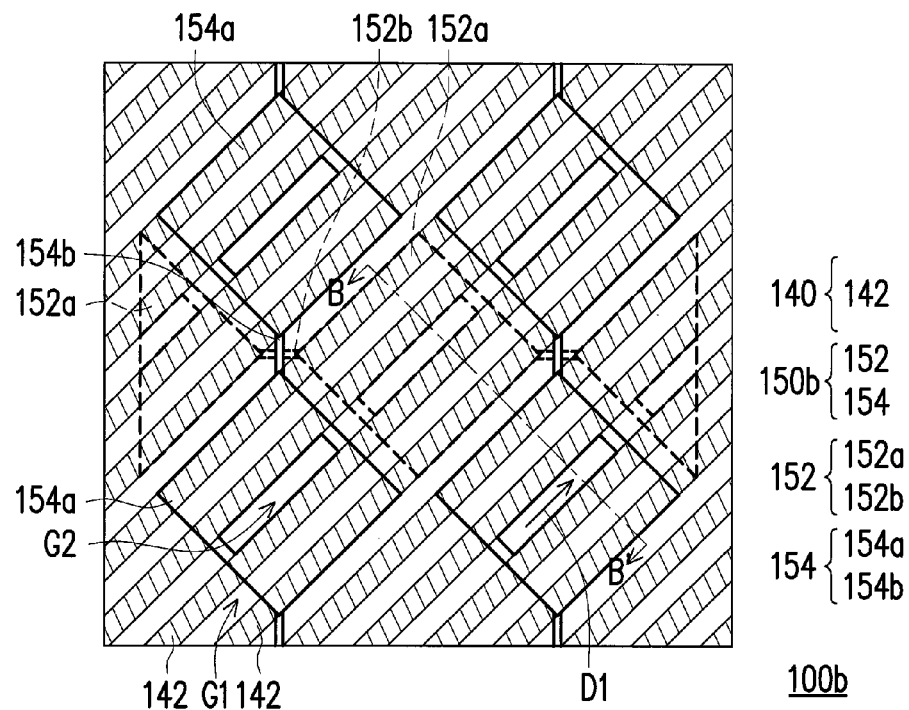
FIG. 4C is a schematic diagram illustrating the optical switching device depicted in FIG. 4A.
Figure 4D:
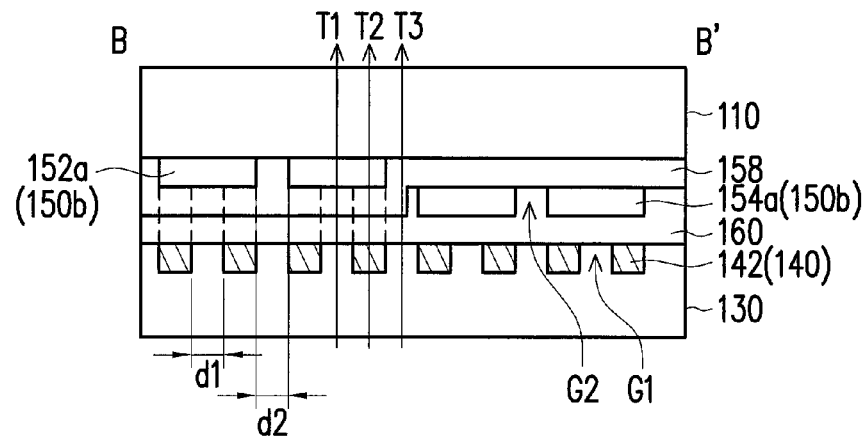
FIG. 4D is a cross-sectional diagram illustrating the optical switching device depicted in FIG. 4C along a sectional line B-B'.

FIG. 4A is a schematic diagram illustrating a touch-sensing layer in an optical switching device according to a second experimental example of the invention. FIG. 4B is a schematic diagram illustrating the first driving layer in the optical switching device depicted in FIG. 4A. FIG. 4C is a schematic diagram illustrating the optical switching device depicted in FIG. 4A. FIG. 4D is a cross-sectional diagram illustrating the optical switching device depicted in FIG. 4C along a sectional line B-B'. With reference to FIG. 4A to FIG. 4D, in the present experimental example, the touch-sensing layer 150b also has a plurality of first sensing electrodes 152 and a plurality of second sensing electrodes 154. The difference between the touch-sensing layer 150b described in the present experimental example and the touch-sensing layer 150a described in the first experimental example lies in that each of the first and second electrode portions 152a and 154a has one second gap G2, and each of the second gaps G2 of the first and second electrode portions 152a and 154a substantially extends along the first direction D1, as shown in FIG. 4A. Similarly, in the present experimental example, the first gaps G1 also exist between the first driving electrodes 142 in the first driving layer 140, and each of the first gaps G1 substantially extends along the first direction D1, as shown in FIG. 4B. Therefore, when the touch-sensing layer 150b and the first driving layer 140 are sequentially arranged to form the optical switching device 100b described in the present experimental example, as shown in FIG. 4C and FIG. 4D, the extension directions of the second gaps G2 of the first and second sensing electrodes 152 and 154 are substantially the same as the extension directions of the first gaps G1 between the first driving electrodes 142, so as to effectively resolve the issue of moire which arises in the optical switching device 100a described in the first experimental example. The arrangement of the first and second sensing electrodes 152 and 154 may be referred to as that described in the first experimental example (e.g., the shape of the sensing electrodes). Other descriptions in the first experimental example may also serve as references here. For instance, the first electrode portions 152a, the first bridge portions 152b, and the second electrode portions 154a shown in FIG. 3D may be coplanar and formed by patterning a single-layered conductive layer, the first electrode portions 152a and the first bridge portions 152b are connected and are in contact with one portion of a surface of the first substrate 110, and the second electrode portions 154a are in contact with another portion of the surface of the first substrate 110. The first bridge portions 152b are located on one side of the insulation patterns 156, and the second bridge portions 154b are constituted by another conductive layer and formed on the other side of the insulation patterns 156, such that the insulation patterns 156 are located between the intersected first and second bridge portions 152b and 154b which are electrically insulated and are not in contact. Here, the other side (i.e., the second side) is the back side of the one side (i.e., the first side); that is, one of the two sides (i.e., the first side) of the insulation patterns 156 is close to an inner surface of the first substrate 110, and the other side (i.e., the second side) of the insulation patterns 156 is away from the inner surface of the first substrate 110. In a preferred embodiment, the first electrode portions 152a, the first bridge portions 152b, and the second electrode portions 154a may be coplanar and formed by patterning a single-layered conductive layer. According to another embodiment of the invention, the touch-sensing layer 150b further includes a second insulation layer 158 located between the first sensing electrodes 152 and the second sensing electrodes 154. Namely, in the present experimental example, the touch-sensing layer 150b has a double-layered touch-sensing structure. The first sensing electrodes 152 and the second sensing electrodes 154 are not coplanar. The first electrode portions 152a and the first bridge portions 152b of the first sensing electrodes 152 are connected and are in contact with one portion of the surface of the first substrate 110, the second insulation layer 158 covers the whole first sensing electrodes 152 and one portion of the inner surface of the first substrate 110, and the second electrode portions 154a and the second bridge portions 154b of the second sensing electrodes 154 are formed on the second insulation layer 158. Accordingly, the first sensing electrodes 152 and the second sensing electrodes 154 are located on two respective (i.e., opposite) sides of the second insulation layer 158.

With reference to FIG. 4C and FIG. 4D, in the present experimental example, a width d1 of each of the first gaps G1 is substantially equal to a width d2 of each of the second gaps G2. Besides, an orthogonal projection of some of the first gaps G1 on the first substrate 110 overlaps an orthogonal projection of one of the second gaps G2 on the first substrate 110, and an orthogonal projection of other first gaps G1 on the first substrate 110 overlaps an orthogonal projection of the first electrode portions 152a or an orthogonal projection of the second electrode portions 154a on the first substrate 110. To be specific, in the present experimental example, the orthogonal projection of some of the first gaps G1 on the first substrate 110 is substantially identical to the orthogonal projection of one of the second gaps G2 on the first substrate 110, and the orthogonal projection of other first gaps G1 on the first substrate 110 is located between two orthogonal projections of two adjacent second gaps G2 on the first substrate 110. Namely, since each of the first and second electrode portions 152a and 154a has one of the second gaps G2, some of the first gaps G1 correspond to the second gaps G2, and the other first gaps G1 correspond to the first electrode portions 152a or the second electrode portions 154a.

Subject to the pattern design and the arrangement manner of the first driving layer 140 and the touch-sensing layer 150b, the optical switching device 100b described in the present experimental example has three different transmittance T1, T2, and T3, as shown in FIG. 4D. First, the transmittance is defined here. When a light beam which exemplarily has the visible waveband and is not limited to have one single wavelength penetrates a second substance (material) from a first substance, one portion of the light beam is reflected at an interface of the first substance and the second substance, and the other portion of the light beam passes the second substance, given that the light beam is not absorbed by the second substance. That is, a sum of the transmittance of the light beam and the reflectivity of the light beam at the interface of the two substances may be 1 or 100%. It can then be concluded that the transmittance of the light beam is relevant to the reflectivity of the light beam at the interface of the two substances. The reflectivity of the light beam at the intersection of the two substances may be referred to as interface reflectance which is the square of the ratio of the difference in the refractive indices of the two substances to the sum of the refractive indices of the two substances. It can then be concluded that the interface reflectivity of the light beam at the interface of the two substances is relevant to the refractive indices of the two substances. In view of the above, materials that comply with said refractive indices are selected, and thereby the transmittance of the optical switching device 100b may be calculated by means of the refractive index of each component, i.e., the transmittance of the optical switching device 100b is equal to the product of the differences between the total transmittance and each interface reflectivity. For instance, if two interface reflectance are A and B, the transmittance is equal to $((1-A)*(1-B))*100\%$ (unit: none). In case of plural interface reflectance, said calculations may be repeated.

For instance, in the present experimental example, the refractive indices of the first substrate 110, the first insulation layer 160, and the second insulation layer 158 are 1.5 to 1.55 approximately, and the refractive indices of the first driving electrodes 142 of the first driving layer 140 and the first sensing electrodes 152 and the second sensing electrodes 154 of the touch-sensing layer 150b are 1.7 to 2 approximately (unit of refractive indices: none). The calculation is performed on the following premises: the touch-sensing structure is a one-layered structure; the light beam passes the first driving electrodes 142, the first insulation layer 160, and the first substrate 110; the refractive indices of the first substrate 110 and the first insulation layer 160 are both 1.5; the refractive index of the first driving electrodes 142 is 1.7. Thereby, the calculated reflectivity between the first insulation layer 160 and the first driving electrodes 142 is $((1.7-1.5)/(1.7+1.5))^2=0.0039$, the calculated reflectivity between the first insulation layer 160 and the first substrate 110 is $((1.5-1.5)/(1.5+1.5))^2=0$, and the transmittance is $((1-0.0039)*(1-0))*100\%=99.61\%$. It is alternatively assumed that the touch-sensing structure is a double-layered structure; the light beam passes the first driving electrodes 142, the first insulation layer 160, the second insulation layer 158, and the first substrate 110; the refractive indices of the first substrate 110, the first insulation layer 160, and the second insulation layer 158 are all 1.5; the refractive index of the first driving electrodes 142 is 1.7. Thereby, the calculated reflectivity between the first insulation layer 160 and the first driving electrodes 142 is $((1.7-1.5)/(1.7+1.5))^2=0.0039$, the calculated reflectivity between the first insulation layer 160 and the second insulation layer 158 is $((1.5-1.5)/(1.5+1.5))^2=0$, the calculated reflectivity between the second insulation layer 158 and the first substrate 110 is $((1.5-1.5)/(1.5+1.5))^2=0$, and the transmittance is $((1-0.0039)*(1-0)*(1-0))*100\%=$about 99.61%.

Hence, as shown in the left half of FIG. 4D, the transmittance T1 is calculated on the basis of the light beam sequentially passing the insulation layer, the first electrode portions 152a, and the first substrate 110 from the switchable optical medium 130, and the calculated transmittance T1 is about 99.2%. Here, the insulation layer may include the first insulation layer 160 (i.e., the single-layered touch-sensing structure) or include both the first and second insulation layers 160 and 158 (i.e., the double-layered touch-sensing structure). The transmittance T2 is calculated on the basis of the light beam sequentially passing the first driving electrodes 142, the insulation layer (including only the first insulation layer 160 or both the first and second insulation layers 160 and 158), the first electrode portions 152a, and the first substrate 110 from the switchable optical medium 130, and the calculated transmittance T1 is about 98.8%. The transmittance T3 is calculated on the basis of the light beam sequentially passing the insulation layer (including only the first insulation layer 160 or both the first and second insulation layers 160 and 158) and the first substrate 110 from the switchable optical medium 130, and the calculated transmittance T1 is about 100%. This is because the refractive indices of the first substrate 110, the first insulation layer 160, and the second insulation layer 158 are similar to one another in the present experimental example. Similarly, as shown in the right half of FIG. 4D, the transmittance T1 is calculated on the basis of the light beam sequentially passing the insulation layer, the second electrode portions 154a, and the first substrate 110 from the switchable optical medium 130; the transmittance T2 is calculated on the basis of the light beam sequentially passing the first driving electrodes 142, the insulation layer, the second electrode portions 154a, and the first substrate 110 from the switchable optical medium 130; the transmittance T3 is calculated on the basis of the light beam sequentially passing the insulation layer and the first substrate 110 from the switchable optical medium 130. Here, the insulation layer may include the first insulation layer 160 (i.e., the single-layered touch-sensing structure) or include both the first and second insulation layers 160 and 158 (i.e., the double-layered touch-sensing structure), and the transmittance T1, T2, and T3 shown in the right half of FIG. 4D are substantially the same as those shown in the left half of FIG. 4D. It can be deduced that the optical switching device 100b described in the present experimental example has three different transmittance T1, T2, and T3, and the difference among the transmittance T1, T2, and T3 is about 1.2%. Such a difference is so slight that a user is not able to tell with his or her eyes. Accordingly, the uniform and even transmittance of the optical switching device 100b allows the stereoscopic display device to achieve favorable optical visual effects.

Figure 5A:
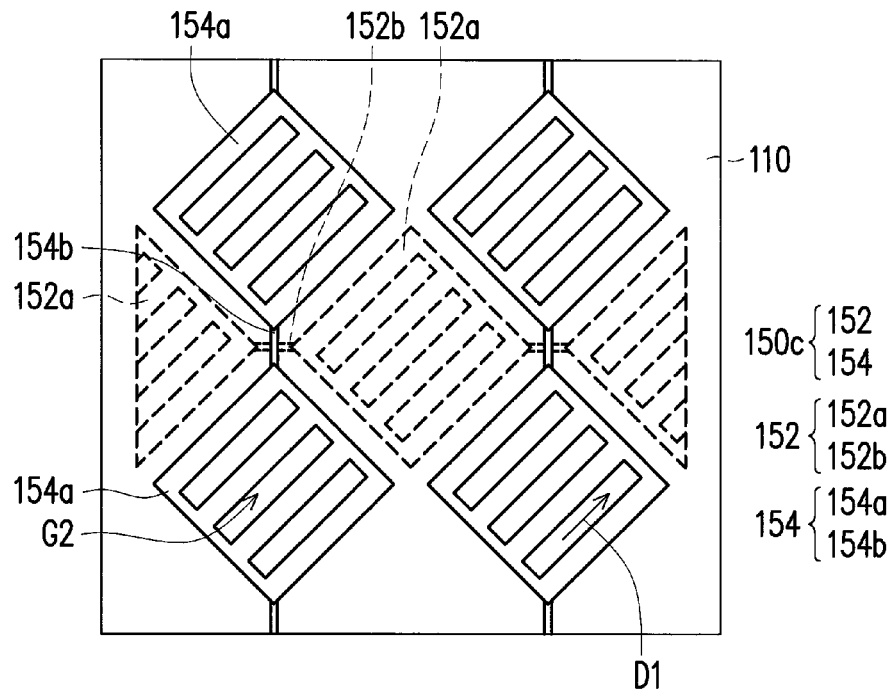
FIG. 5A is a schematic diagram illustrating a touch-sensing layer in an optical switching device according to a third experimental example of the invention.
Figure 5B:
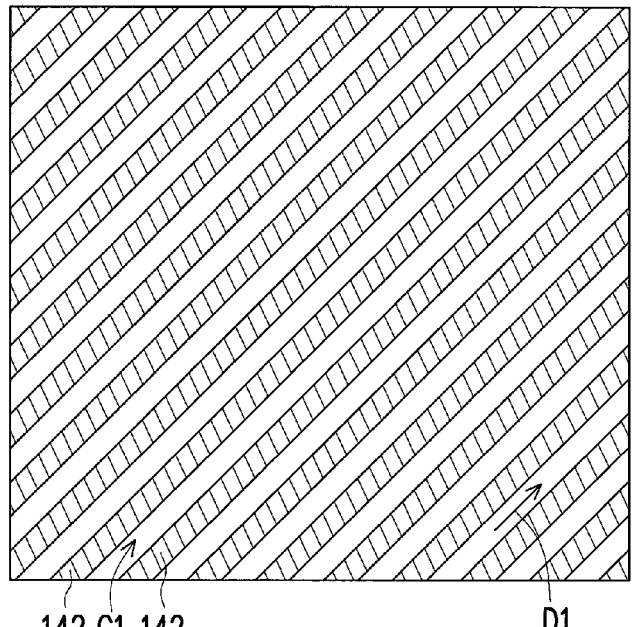
FIG. 5B is a schematic diagram illustrating the first driving layer in the optical switching device depicted in FIG. 5A.
Figure 5C:
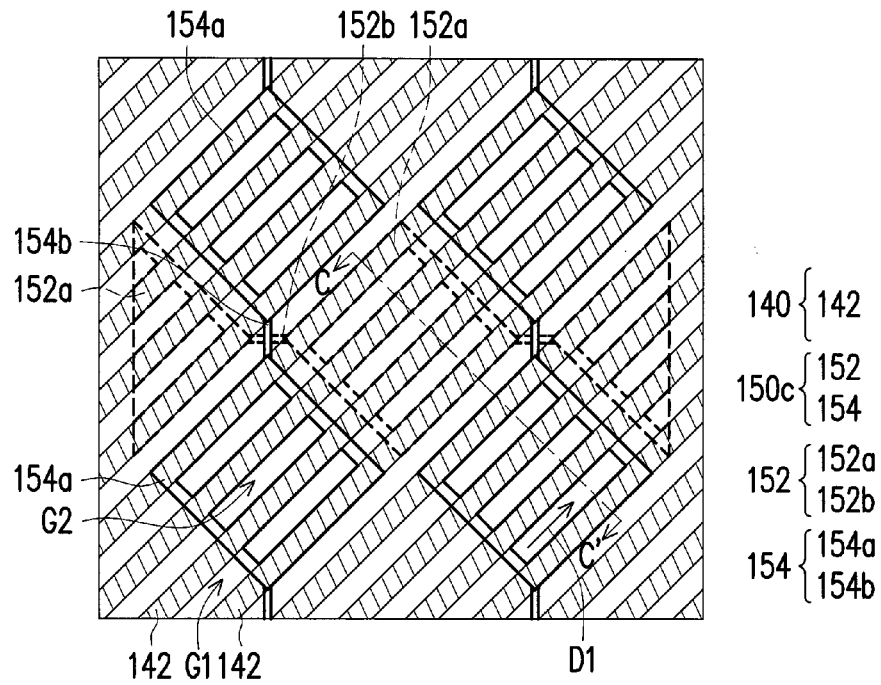
FIG. 5C is a schematic diagram illustrating the optical switching device depicted in FIG. 5A.
Figure 5D:
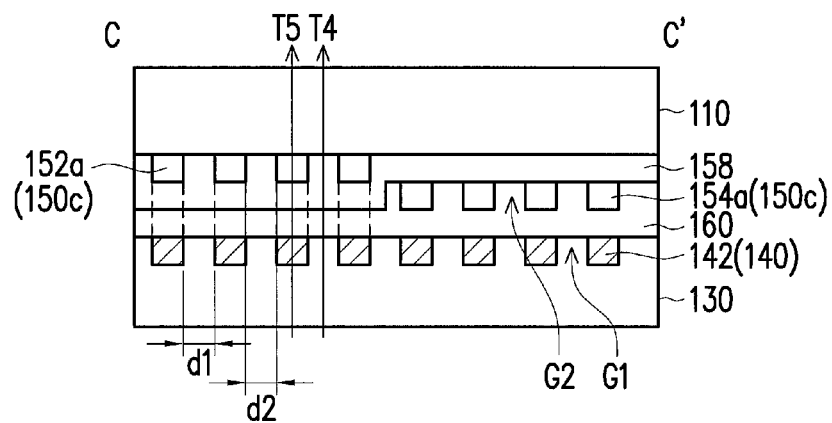
FIG. 5D is a cross-sectional diagram illustrating the optical switching device depicted in FIG. 5C along a sectional line C-C'.

FIG. 5A is a schematic diagram illustrating a touch-sensing layer in an optical switching device according to a third experimental example of the invention. FIG. 5B is a schematic diagram illustrating the first driving layer in the optical switching device depicted in FIG. 5A. FIG. 5C is a schematic diagram illustrating the optical switching device depicted in FIG. 5A. FIG. 5D is a cross-sectional diagram illustrating the optical switching device depicted in FIG. 5C along a sectional line C-C'. With reference to FIG. 5A to FIG. 5D, in the present experimental example, the touch-sensing layer 150c also has a plurality of first sensing electrodes 152 and a plurality of second sensing electrodes 154, and the first sensing electrodes 152 are electrically insulated from and are not in contact with the second sensing electrodes 152. Specifically, the first sensing electrodes 152 and the second sensing electrodes are separated by the second insulation layer 158. Descriptions regarding the shape of the first and second sensing electrodes 152 and 154, the arrangement of the first insulation layer 160 or the first and second insulation layers 160 and 180, and the single-layered or double-layered touch-sensing structure may be referred to as those provided in the first or second experimental example and thus will not be further given hereinafter.

The difference between the touch-sensing layer 150c described in the present experimental example and the touch-sensing layer 150b described in the second experimental example lies in that each of the first and second electrode portions 152a and 154a has plural second gaps G2, and each of the second gaps G2 of the first and second electrode portions 152a and 154a extends along the first direction D1, as shown in FIG. 5A. Similarly, in the present experimental example, the first gaps G1 also exist between the first driving electrodes 142 in the first driving layer 140, and each of the first gaps G1 extends along the first direction D1, as shown in FIG. 5B. Therefore, when the touch-sensing layer 150c and the first driving layer 140 are sequentially arranged to form the optical switching device 100c described in the present experimental example, as shown in FIG. 5C and FIG. 5D, the extension directions of the second gaps G2 of the first and second sensing electrodes 152 and 154 are substantially the same as the extension directions of the first gaps G1 between the first driving electrodes 142. As a result, the optical switching device 100c can also resolve the issue of moire effect which arises in the first experimental example.

From another perspective, with reference to FIG. 5C and FIG. 5D, in the present experimental example, the width d1 of each of the first gaps G1 is substantially equal to the width d2 of each of the second gaps G2. Besides, the orthogonal projection of each of the first gaps G1 on the first substrate 110 overlaps the orthogonal projection of one of the second gaps G2 on the first substrate 110. In particular, according to the present experimental example, the orthogonal projection of each of the first gaps G1 on the first substrate 110 is substantially the same as the orthogonal projection of one of the second gaps G2 on the first substrate 110. Namely, each second gap G2 of the first and second electrode portions 152a and 154a respectively corresponds to one first gap G1 between the first driving electrodes 142.

Subject to the configuration and the arrangement manner of the first driving layer 140 and the touch-sensing layer 150c, the optical switching device 100c described in the present experimental example has two different transmittances T4 and T5, as shown in FIG. 5D. The definition of the transmittance, the unit of the transmittance, and the way to calculate the transmittance may be referred to as those provided above and thus will be omitted hereinafter. In the present experimental example, the refractive indices of the first substrate 110, the first insulation layer 160, and the second insulation layer 158 are 1.5 to 1.55 approximately, and the refractive indices of the first driving electrodes 142 of the first driving layer 140 and the first sensing electrodes 152 and the second sensing electrodes 154 of the touch-sensing layer 150c are 1.7 to 2 approximately. Hence, as shown in the left half of FIG. 5D, the transmittance T4 is calculated on the basis of the light beam sequentially passing the insulation layer and the first substrate 110 from the switchable optical medium 130, and the calculated transmittance T4 is about 100%. Here, the insulation layer may include the first insulation layer 160 (i.e., the single-layered touch-sensing structure) or include both the first and second insulation layers 160 and 158 (i.e., the double-layered touch-sensing structure). The transmittance T5 is calculated on the basis of the light beam sequentially passing the first driving electrodes 142, the insulation layer (including only the first insulation layer 160 or both the first and second insulation layers 160 and 158), the first electrode portions 152a, and the first substrate 110 from the switchable optical medium 130, and the calculated transmittance T5 is about 98.8%. Similarly, as shown in the right half of FIG. 5D, the transmittance T4 is calculated on the basis of the light beam sequentially passing the insulation layer and the first substrate 110 from the switchable optical medium 130; the transmittance T5 is calculated on the basis of the light beam sequentially passing the first driving electrodes 142, the insulation layer, the second electrode portions 154a, and the first substrate 110 from the switchable optical medium 130. Here, the insulation layer may include the first insulation layer 160 (i.e., the single-layered touch-sensing structure) or include both the first and second insulation layers 160 and 158 (i.e., the double-layered touch-sensing structure), and the transmittances T4 and T5 shown in the right half of FIG. 5D are substantially the same as those shown in the left half of FIG. 5D. It can be deduced that the optical switching device 100c described in the present experimental example has two different transmittances T4 and T5 which differ from each other by about 1.2%. Thereby, the optical switching device 100c may have uniform and even transmittances. If the optical switching device 100c is applied to a stereoscopic display device, the uniform and even transmittances of the optical switching device 100c allow the stereoscopic display device to achieve favorable optical visual effects.

Besides, according to the result of comparing the optical switching device 100c (described in the present experimental example) with the optical switching device 100b (described in the second experimental example), the difference in the transmittances of the optical switching device 100c is similar to the difference in the transmittances of the optical switching device 100b; however, the optical switching device 100c merely has two different transmittances, and the optical switching device 100b has three different transmittances. That is, the overall transmittance of the optical switching device 100c is more even than the overall transmittance of the optical switching device 100b. When the optical switching device 100c and the optical switching device 100b are both applied to a stereoscopic display device, the optical visual effects achieved by the stereoscopic display device equipped with the optical switching device 100c are better than those accomplished by the stereoscopic display device equipped with the optical switching device 100b.

Figure 6A:
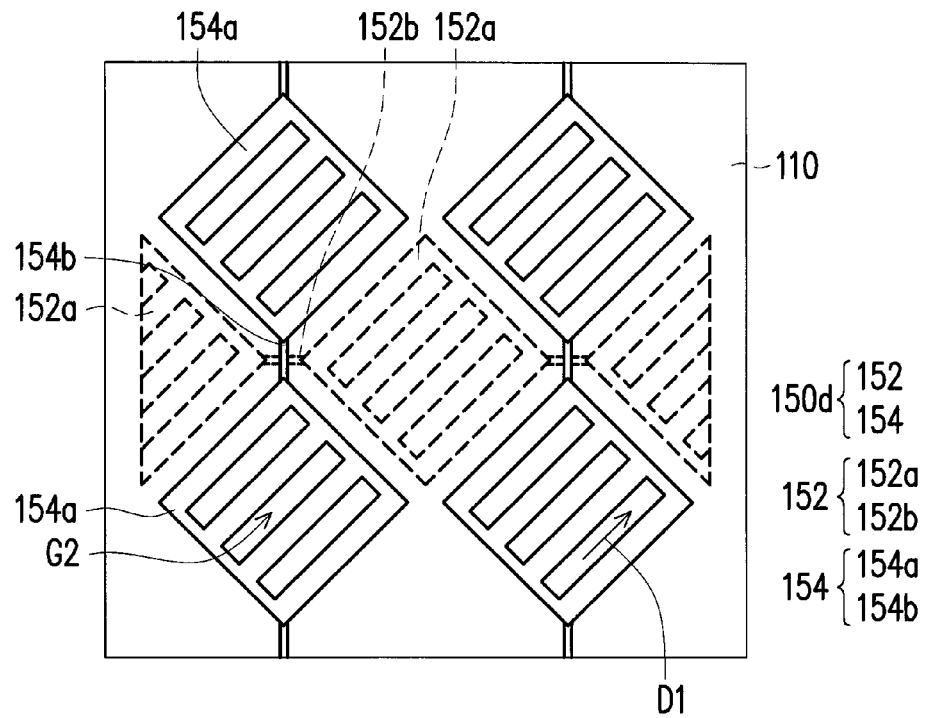
FIG. 6A is a schematic diagram illustrating a touch-sensing layer in an optical switching device according to a fourth experimental example of the invention.
Figure 6B:
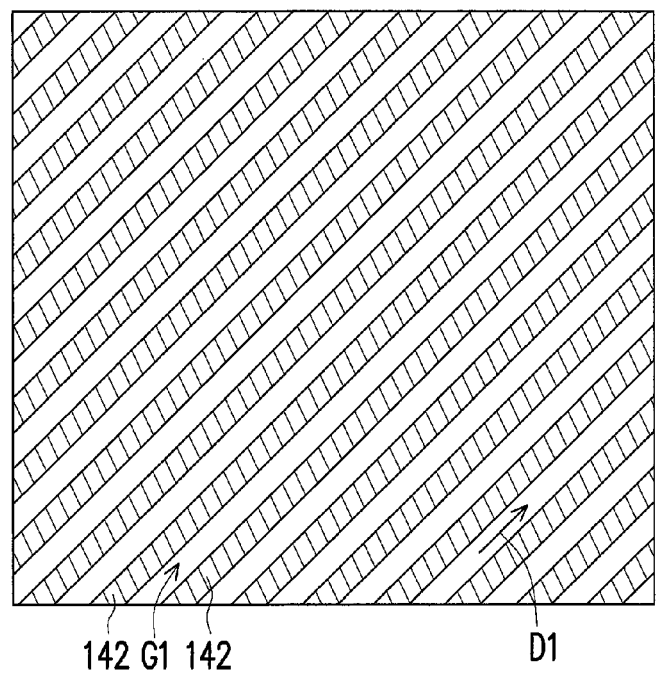
FIG. 6B is a schematic diagram illustrating the first driving layer in the optical switching device depicted in FIG. 6A.
Figure 6C:
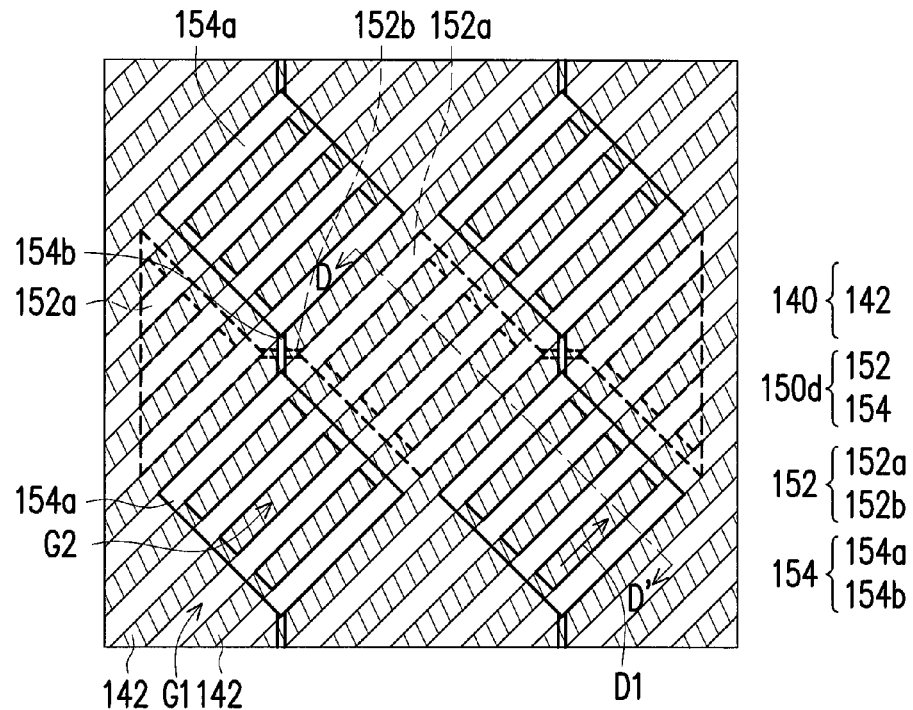
FIG. 6C is a schematic diagram illustrating the optical switching device depicted in FIG. 6A.
Figure 6D:
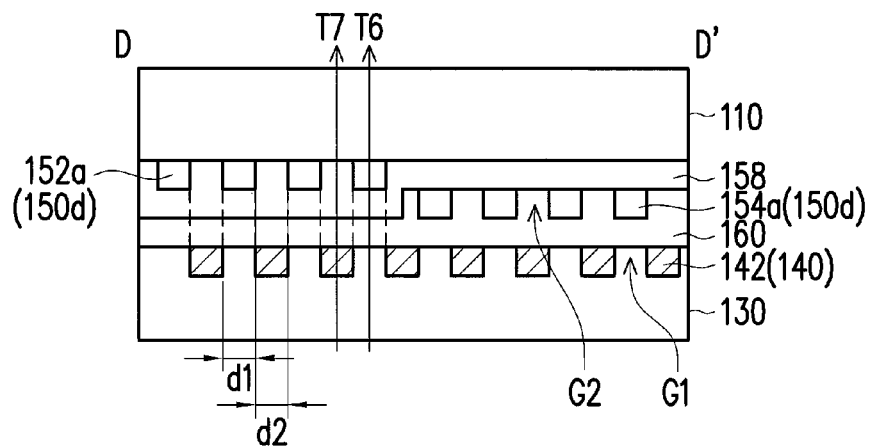
FIG. 6D is a cross-sectional diagram illustrating the optical switching device depicted in FIG. 6C along a sectional line D-D'.

FIG. 6A is a schematic diagram illustrating a touch-sensing layer in an optical switching device according to a fourth experimental example of the invention. FIG. 6B is a schematic diagram illustrating the first driving layer in the optical switching device depicted in FIG. 6A. FIG. 6C is a schematic diagram illustrating the optical switching device depicted in FIG. 6A. FIG. 6D is a cross-sectional diagram illustrating the optical switching device depicted in FIG. 6C along a sectional line D-D'. With reference to FIG. 6A to FIG. 6D, in the present experimental example, the touch-sensing layer 150d is similar to the touch-sensing layer 150c described in the third experimental example and thus will not be further described herein. Each second gap G2 of the first and second electrode portions 152a and 154a in the touch-sensing layer 150d extends along the first direction D1, as shown in FIG. 6A, and each first gap G1 between the first driving electrodes 142 of the first driving layer 140 extends along the first direction D1 as well, as shown in FIG. 6B. Therefore, when the touch-sensing layer 150d and the first driving layer 140 are sequentially arranged to form the optical switching device 100d described in the present experimental example, as shown in FIG. 6C and FIG. 6D, the extension directions of the second gaps G2 of the first and second sensing electrodes 152 and 154 are substantially the same as the extension directions of the first gaps G1 between the first driving electrodes 142. As a result, the optical switching device 100d can also resolve the issue of moire which arises in the first experimental example.

From another perspective, with reference to FIG. 6C and FIG. 6D, in the present experimental example, the width d1 of each of the first gaps G1 is substantially equal to the width d2 of each of the second gaps G2. Besides, the orthogonal projection of each of the first gaps G1 on the first substrate 110 is located between the orthogonal projections of two adjacent second gaps G2 on the first substrate 110. In particular, according to the present experimental example, the orthogonal projection of each of the first gaps G1 on the first substrate 110 and the orthogonal projection of each of the second gaps G2 on the first substrate 110 are alternately arranged. Namely, each second gap G2 respectively corresponds to one first driving electrode 142, and each first gap G1 respectively corresponds to one first electrode portion 152a or one second electrode portion 154a.

Subject to the configuration and the arrangement manner of the first driving layer 140 and the touch-sensing layer 150d, the optical switching device 100d described in the present experimental example has two different transmittances T6 and T7, as shown in FIG. 6D. The definition of the transmittance, the way to calculate the transmittance, and the refractive index of each material layer may be referred to as those provided above and thus will be omitted hereinafter. Hence, as shown in the left half of FIG. 6D, the transmittance T6 is calculated on the basis of the light beam sequentially passing the insulation layer, the first electrode portions 152a, and the first substrate 110 from the switchable optical medium 130, and the calculated transmittance T6 is about 99.2%. Here, the insulation layer may include the first insulation layer 160 (i.e., the single-layered touch-sensing structure) or include both the first and second insulation layers 160 and 158 (i.e., the double-layered touch-sensing structure). The transmittance T7 is calculated on the basis of the light beam sequentially passing the first driving electrodes 142, the insulation layer (including only the first insulation layer 160 or both the first and second insulation layers 160 and 158), and the first substrate 110 from the switchable optical medium 130, and the calculated transmittance T7 is about 99.6%. Similarly, as shown in the right half of FIG. 6D, the transmittance T6 is calculated on the basis of the light beam sequentially passing the insulation layer, the second electrode portions 154a, and the first substrate 110 from the switchable optical medium 130; the transmittance T7 is calculated on the basis of the light beam sequentially passing the first driving electrodes 142, the insulation layer, and the first substrate 110 from the switchable optical medium 130. Here, the insulation layer may include the first insulation layer 160 (i.e., the single-layered touch-sensing structure) or include both the first and second insulation layers 160 and 158 (i.e., the double-layered touch-sensing structure), and the transmittances T6 and T7 shown in the right half of FIG. 6D are substantially the same as those shown in the left half of FIG. 6D. It can be deduced that the optical switching device 100d described in the present experimental example has two different transmittances T6 and T7 which differ from each other by about 0.4%. Thereby, the optical switching device 100d may have uniform and even transmittances. If the optical switching device 100d is applied to a stereoscopic display device, the uniform and even transmittances of the optical switching device 100d allow the stereoscopic display device to achieve favorable optical visual effects.

Besides, according to the result of comparing the optical switching device 100d (described in the present experimental example) with the optical switching device 100c (described in the third experimental example), the optical switching devices 100c and 100d both have two different transmittances; however, the difference in the transmittances of the optical switching device 100d is about 0.4%, and the difference in the transmittances of the optical switching device 100c is about 1.2%. That is, the overall transmittance of the optical switching device 100d is more even than the overall transmittance of the optical switching device 100c. When the optical switching device 100d and the optical switching device 100c are both applied to a stereoscopic display device, the optical visual effects achieved by the stereoscopic display device equipped with the optical switching device 100d are better than those accomplished by the stereoscopic display device equipped with the optical switching device 100c.

From the descriptions provided in the previous four experimental examples, it can be deduced that the pattern design and the arrangement manner of the touch-sensing layer and the first driving layer not only affect the transmittance of the optical switching device but also pose an impact on the optical visual effects of the stereoscopic display device equipped with the optical switching device. For instance, in the optical switching device, when the extension direction of the first gaps G1 is substantially parallel to the extension direction of the second gaps G2, i.e., the extension direction of the first gaps G1 is substantially the same as the extension direction of the second gaps G2, the issue of moire is not likely to arise in the stereoscopic display device equipped with the optical switching device. Besides, the alignment or the alternate arrangement of the first and second gaps G1 and G2 also influences the uniformity of the overall transmittance of the stereoscopic display device. Based on the desired optical effects, designers are able to determine the arrangement of the first and second gaps G1 and G2.

Figure 7A:
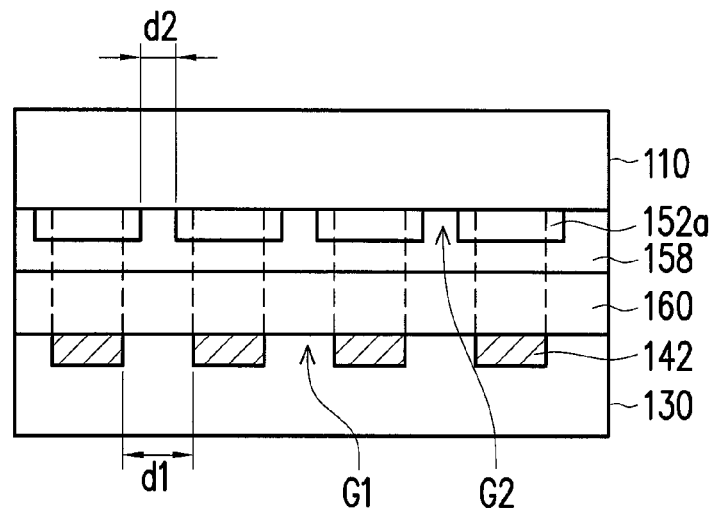
FIG. 7A and FIG. 7B are cross-sectional diagrams respectively illustrating an optical switching device according to other embodiments of the invention.
Figure 7B:
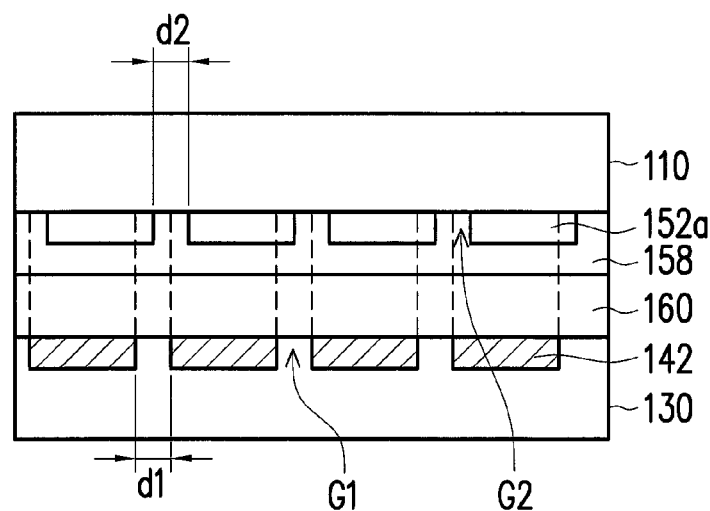

In addition to the four experimental examples, other embodiments also provide examples of implementing the optical switching device. FIG. 7A and FIG. 7B are cross-sectional diagrams respectively illustrating an optical switching device according to other embodiments of the invention. For instance, in the embodiment shown in FIG. 7A, the first gaps G1 respectively correspond to the second gaps G2, and the width d1 of each first gap G1 is substantially greater than the width d2 of each second gap G2; therefore, the orthogonal projection of each second gap G2 on the first substrate 110 completely falls within the orthogonal projection of the corresponding first gap G1 on the first substrate 110. In another embodiment of the invention, the width d1 of each of the first gaps G1 may be substantially smaller than the width d2 of each of the second gaps G2, such that the orthogonal projection of each of the first gaps G1 on the first substrate 110 completely falls within the orthogonal projection of the corresponding second gap G2 on the first substrate 110. In the embodiment shown in FIG. 7B, the first gaps G1 respectively correspond to the second gaps G2, and the width d1 of each first gap G1 is substantially equal to the width d2 of each second gap G2. Nevertheless, the orthogonal projection of each first gap G1 on the first substrate 110 and the orthogonal projection of each second gap G2 on the first substrate 110 are alternately arranged, for instance, such that the orthogonal projection of each first gap G1 on the first substrate 110 partially overlaps the orthogonal projection of one corresponding second gap G2 on the first substrate 110. It can be concluded that the relative width and the arrangement manner of the first and second gaps G1 and G2 are not limited in the invention.

In view of the previous experimental examples and embodiments, it can be learned that the issue of moire arising in the stereoscopic display device equipped with the optical display device may be resolved if the first gaps G1 and the second gaps G2 are arranged along the first direction D1. In addition, the relative width and the arrangement manner of the first and second gaps G1 and G2 allow the optical switching device to have different transmittances, and the uniformity of the overall transmittance of the optical switching device may also be affected. Hence, the relative width and the arrangement manner of the first and second gaps G1 and G2 in the optical switching device may be adjusted according to actual requirements, so as to be applied to different kinds of stereoscopic display devices.

Figure 8:
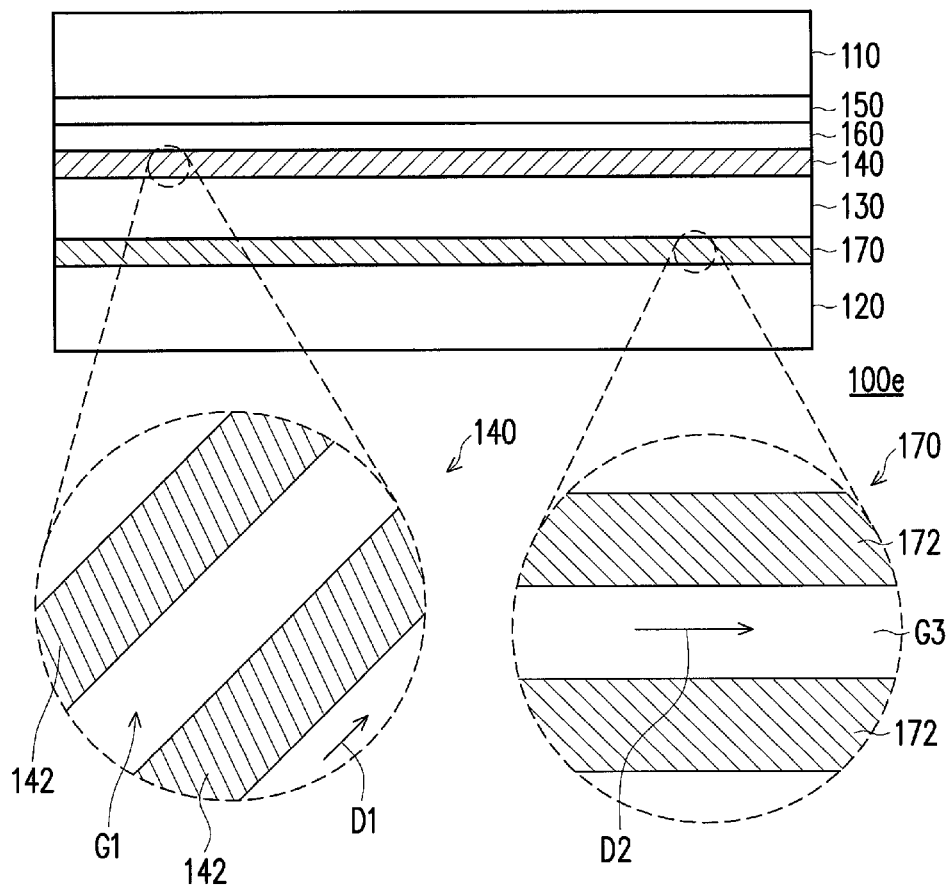
FIG. 8 is a schematic diagram illustrating an optical switching device integrated with a touch structure (device) according to another embodiment of the invention.

Moreover, in the previous experimental examples and embodiments, the number of the driving layer is one, which should however not be construed as a limitation to the invention. FIG. 8 is a schematic diagram illustrating an optical switching device integrated with a touch structure (device) according to another embodiment of the invention. With reference to FIG. 8, in the present embodiment, the optical switching device 100e that is integrated with the touch structure (device) or has the built-in touch structure (device) is similar to the optical switching device 100 depicted in FIG. 1 in terms of structures and functions, while the difference between the two optical switching devices 100e and 100 lies in that the optical switching device 100e further includes a second driving layer 170. The second driving layer 170 is located between the switchable optical medium 130 and the second substrate 120. That is, in the present embodiment, the first driving layer 140 and the second driving layer 170 are respectively located at two respective sides of the switchable optical medium 130 for driving the switchable optical medium 130. Since the first driving layer 140 and the second driving layer 170 are electrically insulated from each other, the first and second driving layers 140 and 170 may be individually controlled. Similarly, the second driving layer 170 may include a plurality of second driving electrodes 172. Besides, the second driving electrodes 172 are bar-shaped electrodes or have any other appropriate shape and are sequentially arranged on the second substrate 120, for instance.

To be specific, third gaps G3 may exist between the second driving electrodes 172, and each of the third gaps G3 extends along a second direction D2. In the present embodiment, the second direction D2 intersects the first direction D1, and thus an included angle is between each third gap G3 and each first gap G1. At this time, the first driving layer 140 or the second driving layer 170 may be respectively driven, so as to display images in a landscape manner or in a portrait manner. In another embodiment, however, the second direction D2 may be parallel to the first direction D1, such that the third gaps G3 are parallel to the first gaps G1. Additionally, the second driving layer 170 may not have the second driving electrodes 172, e.g., the second driving layer 170 may be a planar electrode (e.g., having no pattern or gap, not shown) located between the second substrate 120 and the switchable optical medium 130. Whether the second driving layer 170 is configured or not is not limited in the invention, and neither is the structure of the second driving layer 170.

Specifically, the second driving layer 170 may serve to drive the switchable optical medium 130; nevertheless, when the light beam passes each component from the optical switching device 100e and is emitted from the first substrate 110, the transmittance of the light beam is mainly affected by the components (e.g., the first driving layer 140 and the touch-sensing layer 150) on the first substrate 110. The second driving layer 170 may be made of the material of the first driving layer 140, as described above. That is, after the first driving layer 14 and/or the second driving layer 170 drives the switchable optical medium 130 to adjust the properties of the light beam incident to the second substrate 120, the light beam is transmitted toward the first substrate 110, and hence the transmittance of the light beam is not affected by the structure and the arrangement manner of the second driving layer 170. Accordingly, whether the second driving layer 170 is configured or not and the structure and the arrangement manner of the second driving layer 170 may be determined according to actual requirements, such that the resultant optical switching device may be applicable to different types of stereoscopic display devices. Besides, in order to allow the switchable optical medium 130 to be rapidly adjusted and controlled, the components described in the previous embodiments may be covered by an alignment film (e.g., polyimide (PI), not shown). For instance, the first driving layer 140 and the second substrate 120 may be respectively covered by the alignment film (not shown), i.e., the alignment film (not shown) is respectively formed between the first driving layer 140 and the switchable optical medium 130 and between the second substrate 120 and the switchable optical medium 130. Alternatively, the first driving layer 140 and the second driving layer 170 may be respectively covered by the alignment film (not shown), i.e., the alignment film (not shown) is respectively formed between the first driving layer 140 and the switchable optical medium 130 and between the second driving layer 170 and the switchable optical medium 130 Besides, the material of at least one of the first and second bridge portions 152b and 154b includes the transparent material or the semi-transparent material described above, an opaque material (e.g., metal and alloy thereof), any other appropriate material, or a combination thereof.

Figure 9:
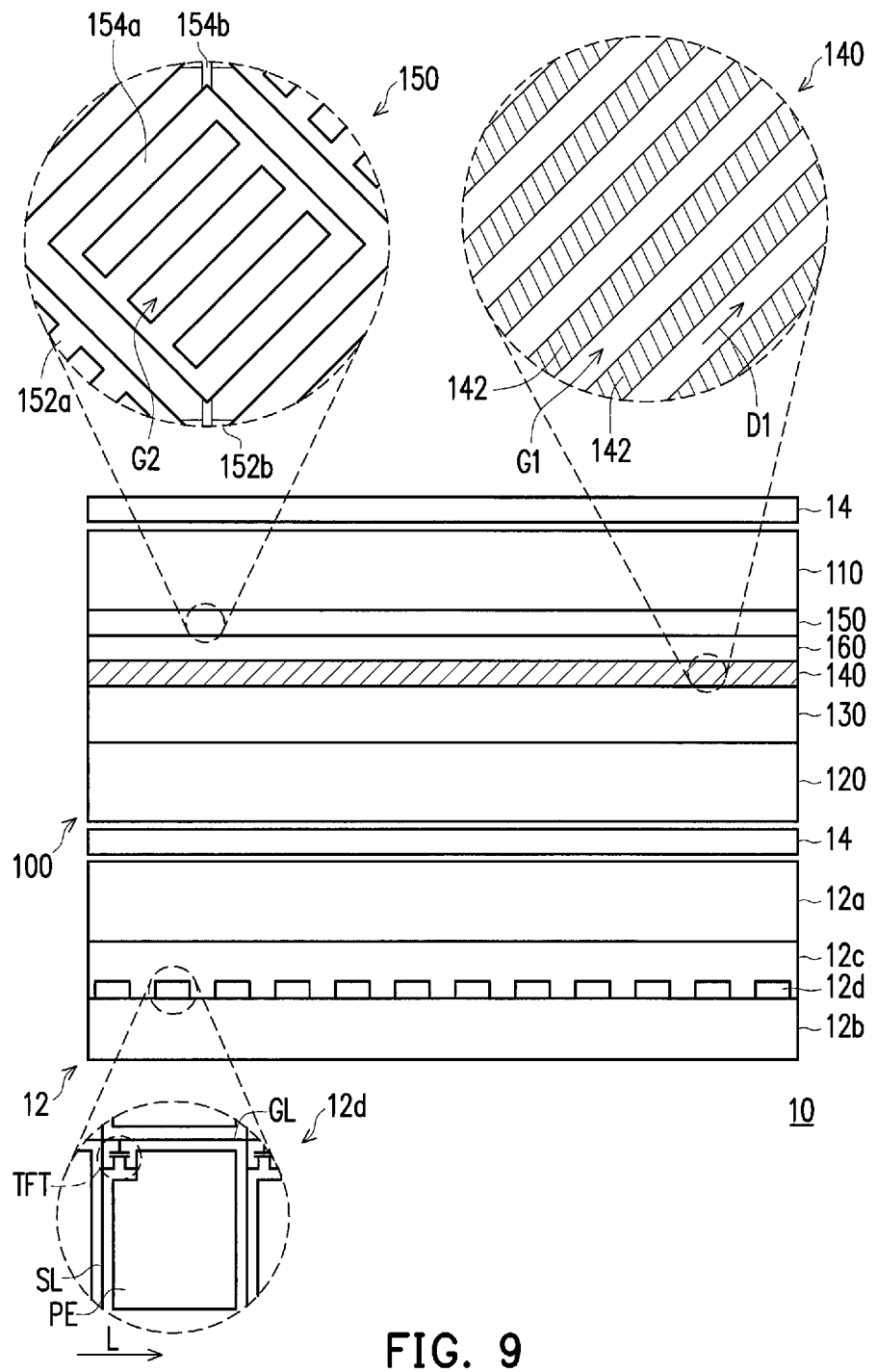
FIG. 9 is a schematic diagram illustrating a stereoscopic display device integrated with a touch structure (device) according to an embodiment of the invention.

FIG. 9 is a schematic diagram illustrating a stereoscopic display device integrated with a touch structure (device) according to an embodiment of the invention. With reference to FIG. 9, in the present embodiment of the invention, a stereoscopic display device 10 that is integrated with a touch structure (device) or has a built-in touch structure (device) includes the aforesaid optical switching device integrated with/having the touch structure (device) 100 and a display panel 12. The optical switching device 100 that is integrated with a touch structure (device) and has the first driving layer 140 is taken for example hereinafter, which should however not be construed as a limitation to the invention. The optical switching device that is integrated with a touch structure (device) and equipped with the first and second driving layers 140 and 170 is also applicable. The display panel 12 is located on one side of the optical switching device 100 integrated with the touch structure (device), and the display panel 12 faces the second substrate 120. Besides, the display panel 12 includes a third substrate 12a, a fourth substrate 12b, and a display medium layer 12c sandwiched by the third substrate 12a and the fourth substrate 12b. The display panel 12 also has a plurality of sub-pixels 12d located between the fourth substrate 12b and the display medium layer 12c. In other embodiments, the sub-pixels 12d may be located on the third substrate 12a or on both the third and fourth substrates 12a and 12b. Each of the sub-pixels 12d has an active device TFT connected to a signal line SL and a pixel electrode PE, the active device TFT is controlled by a scan line GL, and the pixel electrode PE is configured to drive the display medium layer 12c. The active device TFT may include a bottom-gate transistor, a top-gate transistor, any other appropriate active device, or a combination thereof. In addition, a semiconductor material of the transistor may include amorphous silicon, polysilicon, mono-crystalline silicon, micro-crystalline silicon, nano-crystalline silicon, a semiconductor oxide material, any other appropriate material, or a combination thereof. If the first substrate 110 has a rectangular profile, the sub-pixels 12d are arranged in a manner corresponding to an extension direction of the long sides L (shown in FIG. 2) of the first substrate 110. Hence, there may be an included angle between the long sides L of the first substrate 110 and the first gaps G1 between the first driving electrodes 142 of the first driving layer 140, and the included angle ranges from 1° to 179° In the present embodiment, the third substrate 12a or the fourth substrate 12b may be a transparent substrate made of glass, plastic, or any other appropriate transparent material, and the display medium layer 12c may be made of a non-self-illuminating material (e.g., TN (twist nematic)/STN (super twist nematic)/VA (vertical alignment)/IPS (in-plane switching)/blue-phase liquid crystal materials or any other appropriate material), a self-illuminating material (e.g., an organic self-illuminating material, an inorganic self-illuminating material, or any other appropriate material), any other appropriate material, or a combination thereof. Note that the materials of the third substrate 12a, the fourth substrate 12b, and the display medium layer 12c are not limited in the invention, and nor are the types of the display panel 12.

According to the present embodiment, the second substrate 120 of the optical switching device 100 integrated with the touch structure (device) faces the third substrate 12a of the display panel 12. Here, the first substrate 110 of the optical switching device 100, the second substrate 120 of the optical switching device 100, the third substrate 12a of the display panel 12, and the fourth substrate 12b of the display panel 12 are independent from one another. When the display panel 12 displays an image, the first driving layer 140 of the optical switching device 100 may drive the switchable optical medium 130 to change the optical path for presenting the image, such that the image light output by the display panel 12 through the optical switching device 100 is converted into a stereoscopic image. By contrast, if the optical switching device 100 is not driven, the image light output by the display panel 12 through the optical switching device 100 remains as a two-dimensional image.

The optical switching device 100 has a built-in touch structure (device), and the touch-sensing layer 150 is located in the first substrate 110; therefore, a user is able to trigger the touch-sensing layer 150 by touching the outer surface of the first substrate 110 and further operate the stereoscopic display device 10 integrated with the touch structure (device) described herein. Additionally, in the present embodiment, the display medium layer 12c in the display panel 12 is exemplarily made of the non-self-illuminating material (i.e., the liquid crystal material), and the stereoscopic display device 10 integrated with the touch structure (device) further has two polarizers 14 located at two respective sides of the optical switching device 100. In another embodiment of the invention, if the display medium layer 12c exemplarily made of the non-self-illuminating material is applied in the display panel 12, the two polarizers 14 are respectively located on the outer surface of the first substrate 110 and the outer surface of the fourth substrate 12b. Alternatively, if the display medium layer 12c exemplarily made of the self-illuminating material is applied in the display panel 12, and only one polarizer or one optical film is required, the polarizer or the optical film is located on the outer surface of the first substrate 110. Thereby, when the display panel 12 displays an image, the polarizer 14 may adjust the polarization direction of the light beam of the displayed image of the display panel 12. Note that whether the polarizer 14 is configured or not is not limited in the invention.

Figure 10:
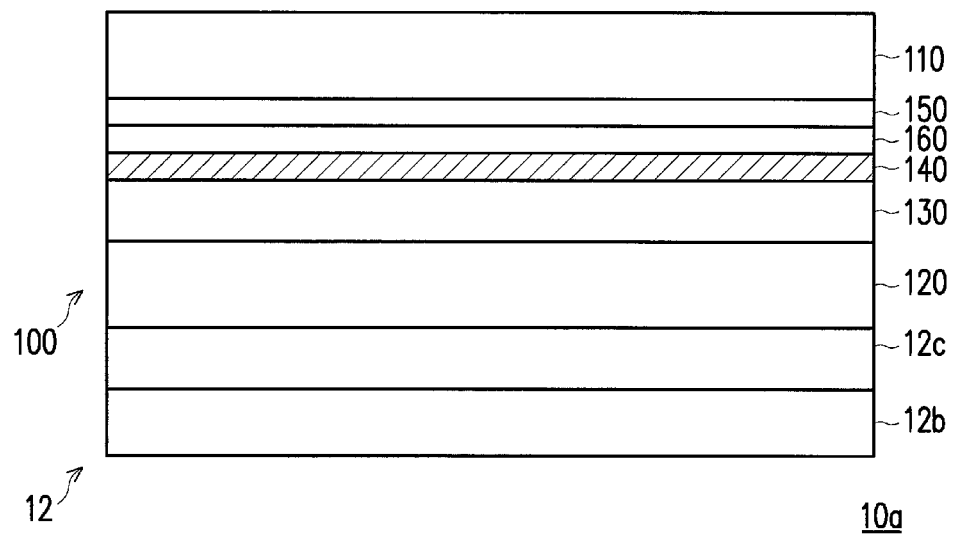
FIG. 10 is a schematic diagram illustrating a stereoscopic display device integrated with a touch structure (device) according to another embodiment of the invention.

FIG. 10 is a schematic diagram illustrating a stereoscopic display device integrated with a touch structure (device) according to another embodiment of the invention. With reference to FIG. 10, in the present embodiment, the stereoscopic display device 10a that is integrated with the touch structure (device) or has the built-in touch structure (device) is similar to the stereoscopic display device 10 in terms of structures, while the difference between the two stereoscopic display devices 10a and 10 lies in that the display panel 12 of the stereoscopic display device 10a is not equipped with the third substrate 12a. The display medium layer 12c of the display panel 12 is sandwiched by the fourth substrate 12b and the second substrate 120 of the optical switching device 100. Since the optical switching device 100 and the display panel 12 share one of the substrates, the thickness of the stereoscopic display device 10a may be reduced, and the optical switching device 100 described herein can still perform the function of converting the image output by the display panel 12 into a stereoscopic image or a two-dimensional image. Moreover, the arrangement of the polarizer may be determined according to the material of the display medium layer 12c in the display panel 12. Specifically, when the display medium layer 12c is made of the non-self-illuminating material, two polarizers are required, and the two polarizers are respectively located on the outer surface of the first substrate 110 and the outer surface of the fourth substrate 12b; alternatively, if the display medium layer 12c is made of the self-illuminating material, only one polarizer or one optical film is required, and the polarizer or the optical film is merely located on the outer surface of the first substrate 110.

The optical switching device in the aforesaid stereoscopic display device 10 and in the aforesaid stereoscopic display device 10a is the optical switching device 100 shown in FIG. 1, for instance; however, in other embodiments that are not shown in the drawings, each of the optical switching devices 100a to 100e may be applied in the aforesaid stereoscopic display device 10 and in the aforesaid stereoscopic display device 10a. Namely, according to actual requirements, the optical switching devices described in the previous embodiments may be respectively applied to different types of stereoscopic display devices, so as to enable the stereoscopic display devices having the built-in touch structures (device) to achieve favorable optical visual effects.

To sum up, the first driving layer in the optical switching device integrated with the touch structure (device) and in the stereoscopic display device drives the switchable optical medium, and the touch-sensing layer is located between the first substrate and the first driving layer, so as to equip the optical switching device or the stereoscopic display device with the built-in touch structure (device). Here, the first gaps exist between the first driving electrodes in the first driving layer, and the second gaps exist in the sensing electrodes of the touch-sensing layer. From the previous experimental examples and embodiments, it can be deduced that the uniformity of the overall transmittance of the optical switching device may be affected by the relative width of the first and second gaps, by the arrangement manner of the first and second gaps, and by whether the extension directions of the first and second gaps are parallel. In the event that the extension directions of the first and second gaps are parallel, the issue of moire effect may be resolved, and the optical switching device may have the satisfactory transmittance. However, the uniformity of the overall transmittance of the optical switching device is still determined by the relative width and the arrangement manner of the first and second gaps. As a result, both the optical switching device integrated with the touch structure (device) and the stereoscopic display device described herein have the built-in touch structure (device), so as to reduce the manufacturing costs/time. Moreover, through adjustment of the relative width and the arrangement manner of the first and second gaps, the optical switching device integrated with the touch structure (device) and the stereoscopic display device described herein may have the favorable transmittance and achieve satisfactory optical visual effects.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical switching device integrated with a touch structure, the optical switching device comprising:
    a first substrate;
    a second substrate opposite to the first substrate;
    a switchable optical medium located between the first substrate and the second substrate;
    a first driving layer located between the first substrate and the switchable optical medium for driving the switchable optical medium, the first driving layer comprising a plurality of first driving electrodes, a plurality of first gaps existing between the first driving electrodes, each of the first gaps extending along a first direction;
    a touch-sensing layer located between the first substrate and the first driving layer, wherein the touch-sensing layer has a plurality of sensing electrodes, each of the sensing electrodes has a plurality of second gaps, each of the second gaps extends along the first direction, and an orthogonal projection of each of the first gaps on the first substrate overlaps an orthogonal projection of one of the second gaps on the first substrate; and
    a first insulation layer located between the first driving layer and the touch-sensing layer.

2. The optical switching device integrated with the touch structure of claim 1, wherein the first substrate has a long side, and an included angle between the first direction and the long side of the first substrate ranges from 1° to 179°.

3. The optical switching device integrated with the touch structure of claim 1, wherein a width of each of the first gaps is substantially equal to a width of each of the second gaps.

4. The optical switching device integrated with the touch structure of claim 1, wherein a width of each of the first gaps is greater than a width of each of the second gaps.

5. The optical switching device integrated with the touch structure of claim 1, wherein a width of each of the first gaps is smaller than a width of each of the second gaps.

6. The optical switching device integrated with the touch structure of claim 1, wherein the sensing electrodes comprise a plurality of first sensing electrodes and a plurality of second sensing electrodes, each of the first sensing electrodes comprises a plurality of first electrode portions and a plurality of first bridge portions, each of the first bridge portions is connected to two adjacent first electrode portions of the first electrode portions, each of the second sensing electrodes comprises a plurality of second electrode portions and a plurality of second bridge portions, each of the second bridge portions is connected to two adjacent second electrode portions of the second electrode portions, the first electrode portions do not overlap the second electrode portions, the second electrode portions do not overlap the first electrode portions, the first bridge portions intersect the second bridge portions, and the second gaps are at least arranged in the first electrode portions and the second electrode portions.

7. The optical switching device integrated with the touch structure of claim 6, wherein the touch-sensing layer further comprises a second insulation layer located between the first sensing electrodes and the second sensing electrodes.

8. The optical switching device integrated with the touch structure of claim 1, further comprising a second driving layer located between the switchable optical medium and the second substrate.

9. The optical switching device integrated with the touch structure of claim 8, wherein the second driving layer comprises a plurality of second driving electrodes, a plurality of third gaps exist between the second driving electrodes, and each of the third gaps extends along a second direction.

10. The optical switching device integrated with the touch structure of claim 9, wherein the second direction is substantially parallel to the first direction.

11. The optical switching device integrated with the touch structure of claim 9, wherein the second direction intersects the first direction.

12. The optical switching device integrated with the touch structure of claim 8, wherein the second driving layer comprises a planar electrode.

13. The optical switching device integrated with the touch structure of claim 1, wherein a signal of the first driving layer is independent from a signal of the touch-sensing layer.

14. A stereoscopic display device integrated with a touch structure, the stereoscopic display device comprising:
    the optical switching device integrated with the touch structure of claim 1; and
    a display panel located on one side of the optical switching device integrated with the touch structure, the display panel comprising a third substrate, a fourth substrate, and a display medium layer sandwiched by the third substrate and the fourth substrate, wherein the display panel has a plurality of sub-pixels, each of the sub-pixels has an active device connected to a signal line and a pixel electrode, and the pixel electrode is configured to drive the display medium layer.

15. An optical switching device integrated with a touch structure, the optical switching device comprising:
    a first substrate;
    a second substrate opposite to the first substrate;
    a switchable optical medium located between the first substrate and the second substrate;
    a first driving layer located between the first substrate and the switchable optical medium for driving the switchable optical medium, the first driving layer comprising a plurality of first driving electrodes, a plurality of first gaps existing between the first driving electrodes, each of the first gaps extending along a first direction;
    a touch-sensing layer located between the first substrate and the first driving layer, wherein the touch-sensing layer has a plurality of sensing electrodes, each of the sensing electrodes has a plurality of second gaps, each of the second gaps extends along the first direction, and an orthogonal projection of each of the first gaps on the first substrate is located between two orthogonal projections of two adjacent second gaps of the second gaps on the first substrate; and a first insulation layer located between the first driving layer and the touch-sensing layer.

16. The optical switching device integrated with the touch structure of claim 15, wherein the first substrate has a long side, and an included angle between the first direction and the long side of the first substrate ranges from 1° to 179°.

17. The optical switching device integrated with the touch structure of claim 15, wherein a width of each of the first gaps is substantially equal to a width of each of the second gaps.

18. The optical switching device integrated with the touch structure of claim 15, wherein a width of each of the first gaps is greater than a width of each of the second gaps.

19. The optical switching device integrated with the touch structure of claim 15, wherein a width of each of the first gaps is smaller than a width of each of the second gaps.

20. The optical switching device integrated with the touch structure of claim 15, wherein the sensing electrodes comprise a plurality of first sensing electrodes and a plurality of second sensing electrodes, each of the first sensing electrodes comprises a plurality of first electrode portions and a plurality of first bridge portions, each of the first bridge portions is connected to two adjacent first electrode portions of the first electrode portions, each of the second sensing electrodes comprises a plurality of second electrode portions and a plurality of second bridge portions, each of the second bridge portions is connected to two adjacent second electrode portions of the second electrode portions, the first electrode portions do not overlap the second electrode portions, the second electrode portions do not overlap the first electrode portions, the first bridge portions intersect the second bridge portions, and the second gaps are at least arranged in the first electrode portions and the second electrode portions.

21. The optical switching device integrated with the touch structure of claim 20, wherein the touch-sensing layer further comprises a second insulation layer located between the first sensing electrodes and the second sensing electrodes.

22. The optical switching device integrated with the touch structure of claim 15, further comprising a second driving layer located between the switchable optical medium and the second substrate.

23. The optical switching device integrated with the touch structure of claim 22, wherein the second driving layer comprises a plurality of second driving electrodes, a plurality of third gaps exist between the second driving electrodes, and each of the third gaps extends along a second direction.

24. The optical switching device integrated with the touch structure of claim 23, wherein the second direction is substantially parallel to the first direction.

25. The optical switching device integrated with the touch structure of claim 23, wherein the second direction intersects the first direction.

26. The optical switching device integrated with the touch structure of claim 22, wherein the second driving layer comprises a planar electrode.

27. The optical switching device integrated with the touch structure of claim 15, wherein a signal of the first driving layer is independent from a signal of the touch-sensing layer.

28. A stereoscopic display device integrated with a touch structure, the stereoscopic display device comprising:
the optical switching device integrated with the touch structure of claim 19; and
a display panel located on one side of the optical switching device integrated with the touch structure, the display panel comprising a third substrate, a fourth substrate, and a display medium layer sandwiched by the third substrate and the fourth substrate, wherein the display panel has a plurality of sub-pixels, each of the sub-pixels has an active device connected to a signal line and a pixel electrode, and the pixel electrode is configured to drive the display medium layer.

29. An optical switching device integrated with a touch structure, the optical switching device comprising:
a first substrate;
a second substrate opposite to the first substrate;
a switchable optical medium located between the first substrate and the second substrate;
a first driving layer located between the first substrate and the switchable optical medium for driving the switchable optical medium, the first driving layer comprising a plurality of first driving electrodes, a plurality of first gaps existing between the first driving electrodes, each of the first gaps extending along a first direction;
a touch-sensing layer located between the first substrate and the first driving layer, wherein the touch-sensing layer has a plurality of sensing electrodes, each of the sensing electrodes has a plurality of second gaps, each of the second gaps extends along the first direction, and an orthogonal projection of each of the first gaps on the first substrate is substantially identical to an orthogonal projection of one of the second gaps on the first substrate; and
a first insulation layer located between the first driving layer and the touch-sensing layer.

30. The optical switching device integrated with the touch structure of claim 29, wherein the first substrate has a long side, and an included angle between the first direction and the long side of the first substrate ranges from 1° to 179°.

31. The optical switching device integrated with the touch structure of claim 29, wherein a width of each of the first gaps is substantially equal to a width of each of the second gaps.

32. The optical switching device integrated with the touch structure of claim 29, wherein a width of each of the first gaps is greater than a width of each of the second gaps.

33. The optical switching device integrated with the touch structure of claim 29, wherein a width of each of the first gaps is smaller than a width of each of the second gaps.

34. The optical switching device integrated with the touch structure of claim 29, wherein the sensing electrodes comprise a plurality of first sensing electrodes and a plurality of second sensing electrodes, each of the first sensing electrodes comprises a plurality of first electrode portions and a plurality of first bridge portions, each of the first bridge portions is connected to two adjacent first electrode portions of the first electrode portions, each of the second sensing electrodes comprises a plurality of second electrode portions and a plurality of second bridge portions, each of the second bridge portions is connected to two adjacent second electrode portions of the second electrode portions, the first electrode portions do not overlap the second electrode portions, the second electrode portions do not overlap the first electrode portions, the first bridge portions intersect the second bridge portions, and the second gaps are at least arranged in the first electrode portions and the second electrode portions.

35. The optical switching device integrated with the touch structure of claim 34, wherein the touch-sensing layer further comprises a second insulation layer located between the first sensing electrodes and the second sensing electrodes.

36. The optical switching device integrated with the touch structure of claim 29, further comprising a second driving layer located between the switchable optical medium and the second substrate.

37. The optical switching device integrated with the touch structure of claim 36, wherein the second driving layer comprises a plurality of second driving electrodes, a plurality of third gaps exist between the second driving electrodes, and each of the third gaps extends along a second direction.

38. The optical switching device integrated with the touch structure of claim 37, wherein the second direction is substantially parallel to the first direction.

39. The optical switching device integrated with the touch structure of claim 37, wherein the second direction intersects the first direction.

40. The optical switching device integrated with the touch structure of claim 36, wherein the second driving layer comprises a planar electrode.

41. The optical switching device integrated with the touch structure of claim 29, wherein a signal of the first driving layer is independent from a signal of the touch-sensing layer.

42. A stereoscopic display device integrated with a touch structure, the stereoscopic display device comprising:
    the optical switching device integrated with the touch structure of claim 29; and
    a display panel located on one side of the optical switching device integrated with the touch structure, the display panel comprising a third substrate, a fourth substrate, and a display medium layer sandwiched by the third substrate and the fourth substrate, wherein the display panel has a plurality of sub-pixels, each of the sub-pixels has an active device connected to a signal line and a pixel electrode, and the pixel electrode is configured to drive the display medium layer.

43. An optical switching device integrated with a touch structure, the optical switching device comprising:
    a first substrate;
    a second substrate opposite to the first substrate;
    a switchable optical medium located between the first substrate and the second substrate;
    a first driving layer located between the first substrate and the switchable optical medium for driving the switchable optical medium, the first driving layer comprising a plurality of first driving electrodes, a plurality of first gaps existing between the first driving electrodes, each of the first gaps extending along a first direction;
    a touch-sensing layer located between the first substrate and the first driving layer;
    a first insulation layer located between the first driving layer and the touch-sensing layer; and
    a second driving layer located between the switchable optical medium and the second substrate, wherein the second driving layer comprises a plurality of second driving electrodes, a plurality of third gaps exist between the second driving electrodes, each of the third gaps extends along a second direction, and the second direction is substantially parallel to the first direction.

44. The optical switching device integrated with the touch structure of claim 43, wherein the first substrate has a long side, and an included angle between the first direction and the long side of the first substrate ranges from 1° to 179°.

45. The optical switching device integrated with the touch structure of claim 43, wherein the touch-sensing layer has a plurality of sensing electrodes, each of the sensing electrodes has a plurality of second gaps, and each of the second gaps extends along the first direction.

46. The optical switching device integrated with the touch structure of claim 45, wherein a width of each of the first gaps is substantially equal to a width of each of the second gaps.

47. The optical switching device integrated with the touch structure of claim 45, wherein a width of each of the first gaps is greater than a width of each of the second gaps.

48. The optical switching device integrated with the touch structure of claim 45, wherein a width of each of the first gaps is smaller than a width of each of the second gaps.

49. The optical switching device integrated with the touch structure of claim 45, wherein the sensing electrodes comprise a plurality of first sensing electrodes and a plurality of second sensing electrodes, each of the first sensing electrodes comprises a plurality of first electrode portions and a plurality of first bridge portions, each of the first bridge portions is connected to two adjacent first electrode portions of the first electrode portions, each of the second sensing electrodes comprises a plurality of second electrode portions and a plurality of second bridge portions, each of the second bridge portions is connected to two adjacent second electrode portions of the second electrode portions, the first electrode portions do not overlap the second electrode portions, the second electrode portions do not overlap the first electrode portions, the first bridge portions intersect the second bridge portions, and the second gaps are at least arranged in the first electrode portions and the second electrode portions.

50. The optical switching device integrated with the touch structure of claim 49, wherein the touch-sensing layer further comprises a second insulation layer located between the first sensing electrodes and the second sensing electrodes.

51. The optical switching device integrated with the touch structure of claim 43, wherein the second driving layer comprises a planar electrode.

52. The optical switching device integrated with the touch structure of claim 43, wherein a signal of the first driving layer is independent from a signal of the touch-sensing layer.

53. A stereoscopic display device integrated with a touch structure, the stereoscopic display device comprising:
    the optical switching device integrated with the touch structure of claim 43; and
    a display panel located on one side of the optical switching device integrated with the touch structure, the display panel comprising a third substrate, a fourth substrate, and a display medium layer sandwiched by the third substrate and the fourth substrate, wherein the display panel has a plurality of sub-pixels, each of the sub-pixels has an active device connected to a signal line and a pixel electrode, and the pixel electrode is configured to drive the display medium layer.

* * * * *